US008963734B2

(12) United States Patent
Karaki

(10) Patent No.: US 8,963,734 B2
(45) Date of Patent: Feb. 24, 2015

(54) REMOTE CONTROLLED PRICING INFORMATION

(71) Applicant: Mohammad Karaki, Boca Raton, FL (US)

(72) Inventor: Mohammad Karaki, Boca Raton, FL (US)

(*) Notice: Subject to any disclaimer, the term of this patent is extended or adjusted under 35 U.S.C. 154(b) by 45 days.

(21) Appl. No.: 13/768,304

(22) Filed: Feb. 15, 2013

(65) Prior Publication Data

US 2014/0232546 A1 Aug. 21, 2014

(51) Int. Cl.
G08B 5/22 (2006.01)
G09F 9/33 (2006.01)
G09G 3/00 (2006.01)
G09F 9/302 (2006.01)

(52) U.S. Cl.
CPC .. *G09F 9/33* (2013.01); *G09G 3/00* (2013.01); *G09F 9/3023* (2013.01)
USPC ................. 340/815.45; 340/396.1; 340/388.5

(58) Field of Classification Search
USPC ............. 340/815.45, 815.53, 815.63, 815.55, 340/815.56, 815.65, 398.3, 388.5, 396.1
See application file for complete search history.

(56) References Cited

U.S. PATENT DOCUMENTS

| 4,006,476 A * | 2/1977 | Romney ................... 340/815.62 |
| 4,028,828 A | 6/1977 | Chao et al. |
| 4,327,511 A | 5/1982 | Rodriquez |
| 4,929,936 A | 5/1990 | Friedman et al. |
| 5,621,991 A | 4/1997 | Gustafson |
| 6,813,853 B1 * | 11/2004 | Tucker ............................ 40/448 |
| 7,000,344 B2 * | 2/2006 | Furlan et al. .................... 40/601 |
| 7,262,708 B1 * | 8/2007 | Addicks ................... 340/815.63 |
| 2003/0167666 A1 | 9/2003 | Close, Jr. |
| 2005/0246927 A1 * | 11/2005 | Krawinkel ...................... 40/544 |
| 2008/0028649 A1 | 2/2008 | Van Ness |
| 2008/0266206 A1 | 10/2008 | Nelson et al. |
| 2011/0188203 A1 | 8/2011 | Smith |

FOREIGN PATENT DOCUMENTS

JP 2001083915 3/2001

* cited by examiner

Primary Examiner — Daniel Previl
(74) Attorney, Agent, or Firm — Mark D. Passler; Akerman LLP

(57) ABSTRACT

A coordinated system of printed circuit board (PCB) assemblies for displaying information, such as advertising and pricing information. Each individual PCB assembly may display a unit price, such as a price for particular type of gasoline or other product. Each complete PCB assembly may have a number of Light Emitting Diode (LED) modules. The LED modules may be interconnected with one or more plug-in back panel modules attached to a housing and to power and control buses. The module housing may be interconnected with a main power supply and a controller. The controller may be configured to remotely and automatically change the price for each PCB assembly within the coordinated system. Each LED module may include a dedicated processor and be configured to have male connectors to plug into corresponding female receptacles on the power and control buses facilitating ease of installation, and replacement or repair of individual LED modules.

18 Claims, 19 Drawing Sheets

SIGNAL FLOW DIAGRAM

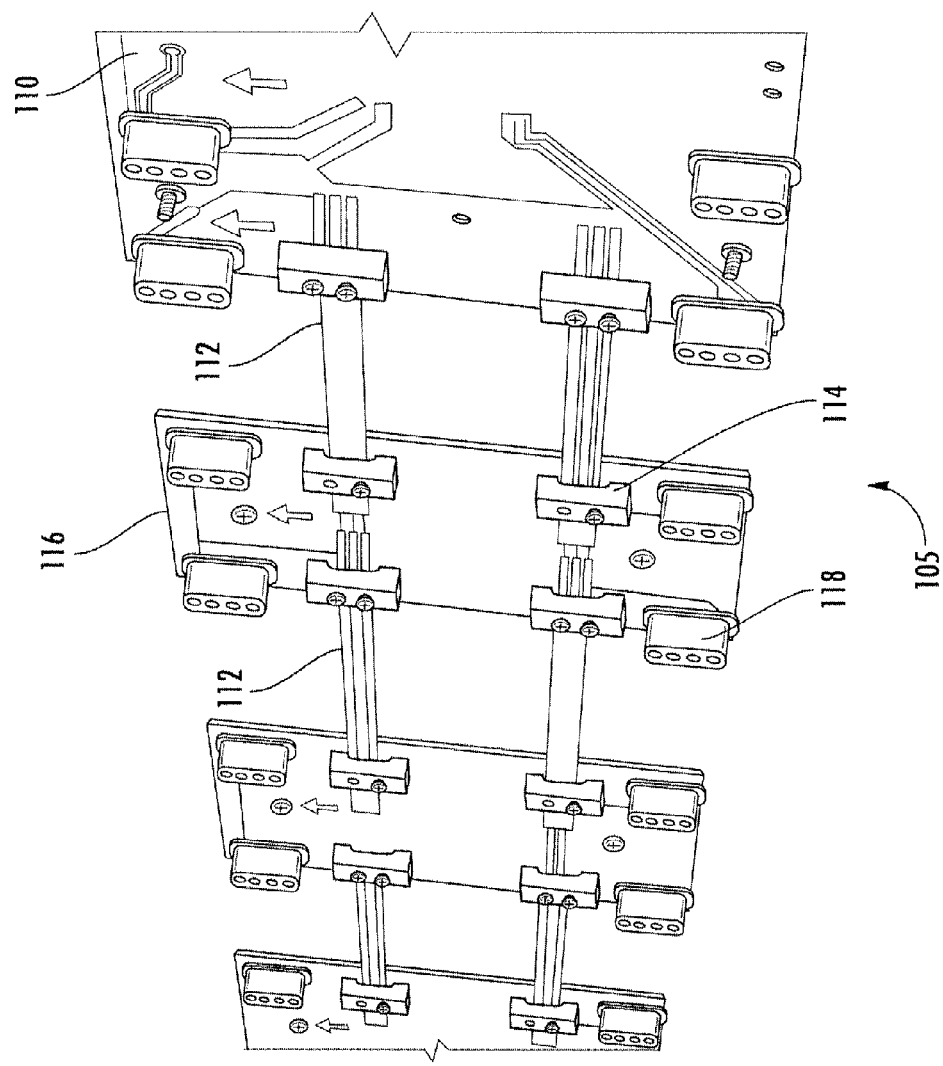

REMOTE CONTROLLED PRICING INFORMATION

FIELD OF THE INVENTION

The present invention relates to advertising, and more particularly to signs that display pricing and other information.

BACKGROUND

In today's society, prices for various products and services often fluctuate rapidly, particularly in response to constantly changing product supply and consumer demand for such products and services. For example, gas prices often fluctuate daily based on oil supplies, consumer demand for oil, world events, and a host of other factors. As a result, gas station owners typically have to manually change the gas prices displayed on signs located at their gas stations on a frequent basis. Many signs at gas stations have plastic number panels that are manually replaced by the gas station owner as gas prices changes. In addition to such traditional signs, various other electronic signs and displays are known in the art. For instance, conventional devices include U.S. Pub. No. 2008/0028649 (entitled "Method for Designing and Constructing a Dot-Matrix Sign Display"); U.S. Pub, No. 2005/0246927 (entitled "Electronic Sign"); U.S. Pat. No. 7,262,708 (entitled "Fueling Station Electronic Pricing Sign"); U.S. Pat. No. 6,813,853 (entitled "Sectional Display System"); U.S. Pub. No. 2003/0167666 (entitled "Fixed Character LED Display Device"); U.S. Pat. No. 5,621,991 (entitled "Lighted Display With Electroluminescent Lamps"); U.S. Pat. No. 4,327,511 (entitled "Luminescent Alphanumeric Modular Display"); U.S. Pat. No. 4,028,828 (entitled "Lighting Display System"); and U.S. Pat. No. 4,006,476 (entitled "Changeable Display Apparatus"). Additionally, LED devices include the "Plug In LED Array," which is disclosed by U.S. Pub, No. 2011/0188203.

Despite the current types of signs and displays that exist today, such signs and displays often include various types of drawbacks. For example, traditional signs and displays may be awkward, poorly designed, and difficult to maintain, service, or repair. Traditional gas station signs, for example, are often difficult to adjust and are often easily damaged by weather or by other means. Additionally, changing advertising information may also require the use of significant resources and dedicated technicians or electricians. Furthermore, traditional signs and displays may include other or additional drawbacks as well.

SUMMARY

The present embodiments include a coordinated and interconnected system of printed circuit board (PCB) assemblies that display information, such as advertising and pricing information. A single PCB assembly may display a unit price, such as a price for a particular type of gasoline or other product. Each PCB assembly that displays a unit price may include a plurality of plug-in light emitting diode (LED) modules. The plug-in LED modules may be interconnected with one or more plug-in back panel modules or one or more power and control buses attached to a LED module housing. The LED module housing may be interconnected with a main power supply and/or controller. A remote controller may be configured to remotely and automatically change the price for each PCB assembly within the coordinated system. Each PCB assembly may include a dedicated processor, and may be configured to have male connectors that plug into corresponding female connectors on the plug-in back panel modules or plug into female connectors on the power and control buses to facilitate ease of installation and replacement or repair of individual plug-in LED modules.

In one embodiment, a PCB assembly for displaying information may be provided. The PCB assembly may include a plurality of power and control buses configured to carry power provided by a power supply and control signals provided by a controller. Additionally, the PCB assembly may include a plurality of plug-in back panel modules configured to be connected to each other via the plurality of power and control buses. The plurality of plug-in back panel modules may include a set of connectors configured to receive the power from the power supply and the control signals from the controller. The PCB assembly may include a plurality of plug-in LED modules for displaying the information via a plurality of LEDs. Each of the plurality of plug-in LED modules may be configured to include a set of pins that are configured to connect to the set of connectors of each of the plug-in back panel modules such that each of the plurality of plug-in LED modules can be individually plugged into, and removed from, each of the plug-in back panel modules. Furthermore, the controller may configured to adjust the information displayed on the plurality of plug-in LED modules by transmitting a signal to adjust the information at the PCB assembly.

In another embodiment, a method for using a PCB assembly for displaying information may be provided. The method may include receiving a control signal from a controller to adjust the information displayed on the PCB assembly. The PCB assembly may include a plurality of power and control buses configured to carry power provided by a power supply and the control signal provided by the controller. Additionally, the PCB assembly may include a plurality of plug-in back panel modules configured to be connected to each other via the plurality of power and control buses. The plurality of plug-in back panel modules may include a set of connectors configured to receive the power and the control signal from the power supply and the controller respectively. The PCB assembly may also include a plurality of plug-in LED modules configured to display the information via a plurality of LEDs. Each of the plurality of plug-in LED modules may be configured to include a set of pins that are configured to connect to the set of connectors of each of the plug-in back panel modules such that each of the plurality of plug-in LED modules can be individually plugged into, and removed from, each of the plug-in back panel modules. The method may also include displaying the information on the PCB assembly via the plurality of LEDs of the plurality of plug-in LED modules. The information may be displayed based on the control signal received from the controller to adjust the information.

In another embodiment, another PCB assembly for displaying information may be provided. The PCB assembly may include a housing and a plurality of power and control buses configured to carry power and control signals. The PCB assembly may also include a plurality of plug-in back panel modules configured to be connected to each other via the plurality of power and control buses. The plurality of plug-in back panel modules may include a set of connectors configured to receive the power and the control signals. Additionally, the PCB assembly may include a plurality of plug-in LED modules for displaying the information via a plurality of LEDs. Each of the plurality of plug-in LED modules may be configured to include a set of pins that are configured to connect to the set of connectors of each of the plug-in back panel modules such that each of the plurality of plug-in LED modules can be individually plugged into, and removed from, each of the plug-in back panel modules. Furthermore, the PCB assembly may include a controller that may be configured to adjust the information displayed on the plurality of plug-in LED modules by transmitting a signal to adjust the information at the PCB assembly. The plurality of power and control buses, the plurality of plug-in back panel modules, and the plurality of plug-in LED modules may be housed in the housing.

In another embodiment, a PCB assembly for displaying changeable advertising information may be provided. The PCB assembly may include two power and control buses mounted horizontally and one above the other within a housing. The two power and control buses may be configured to carry (1) power from a power supply, and (2) control signals from a controller to a top set and a bottom set of female receptacles/connectors attached to the two power and control buses. The PCB assembly may also include a plurality of plug-in and replaceable LED modules. Each of the plurality of plug-in LED modules may be independently controllable by the controller, and have circuitry and LEDs configured to display advertising or pricing information. Each of the plurality of plug-in LED modules further may have a top set and a bottom set of male pins/connectors sized to be compatible with the top set and the bottom set of female receptacles/connectors, respectively, such that each of the plurality of plug-in LED modules may be individually plugged into, and removed from, the two power and control buses during use. The controller may be configured to change the advertising or pricing information being displayed by the plurality of plug-in LED modules. Upon electrical or mechanical failure of one of the plurality of plug-in LED modules, the failed one of the plurality of plug-in LED modules may be replaced with, a new plug-in LED module solely by unplugging the failed one of the plurality of plug-in LED modules from the two power and control buses and then plugging in the new plug-in LED module to the two power and control buses. As a result, the PCB assembly may once again display complete advertising or pricing information.

In another embodiment, a PCB assembly for displaying changeable advertising information may be provided. The PCB assembly may include a housing and two power and control buses mounted horizontally and one above the other within the housing. The two power and control buses may be configured to carry power and control signals to a plurality of top and bottom pairs of female connectors attached to the two power and control buses. The PCB assembly may include a plurality of plug-in and replaceable LED modules. Each of the plurality of plug-in LED modules may be independently controllable by a controller, and have circuitry and LEDs configured to display advertising or pricing information. Each of the plurality of plug-in LED modules may further have a top set and a bottom set of male pins/connectors sized to be compatible with a top and bottom pair of female receptacles/connectors, respectively, such that each of the plurality of plug-in LED modules may be individually plugged into, and removed from, the two power and control buses. The controller may be configured to change the advertising or pricing information being displayed by the plurality of plug-in LED modules. Upon electrical or mechanical failure of one of the plurality of plug-in LED modules, the failed one of the plurality of plug-in LED modules may be replaced with a new plug-in LED module solely by unplugging the failed one of the plurality of plug-in LED modules from the two power and control buses and then plugging in the new plug-in LED module to the two power and control buses. As a result, the PCB assembly may once again display complete advertising or pricing information.

In still another embodiment, a PCB assembly for displaying changeable advertising or pricing information may be provided. The PCB assembly may include a housing, and at least one power and control bus mounted horizontally within the housing. The power and control bus may be configured to carry power and control signals or data to a plurality of top and bottom pairs of female receptacles/connectors interconnected with the power and control bus. The PCB assembly may include a plurality of plug-in and replaceable LED modules. Each of the plurality of plug-in LED modules may be independently controllable by a remote controller, and have circuitry and LEDs configured to display advertising or pricing information. For instance, each plug-in LED modules may display a single character or number. Each of the plurality of plug-in LED modules may further have a top set and a bottom set of male pins/connectors sized to be compatible with a top and bottom pair of female receptacles/connectors, respectively, such that each of the plurality of plug-in LED modules may be individually plugged into, and removed from, the power and control bus. The remote controller may be configured to change the advertising or pricing information being displayed by the plurality of plug-in LED modules. Upon electrical or mechanical failure of one of the plurality of plug-in LED modules, the failed one of the plurality of plug-in LED modules may be replaced with a new plug-in LED module solely by unplugging the failed one of the plurality of plug-in LED modules from the corresponding top and bottom pair of female receptacles/connectors and then plugging in the new plug-in LED module to the corresponding top and bottom pair of female receptacles/connectors. As a result, the PCB assembly may once again display complete advertising or pricing information.

Advantages of the present invention will become more apparent to those skilled in the art from the following description of the preferred embodiments which have been shown and described by way of illustration. As will be realized, the invention is capable of other and different embodiments, and its details are capable of modification in various respects. Accordingly, the drawings and description are illustrative in nature and not restrictive.

BRIEF DESCRIPTION OF THE DRAWINGS

There are shown in the drawings arrangements which are presently discussed, it being understood, however, that the invention is not limited to the precise arrangements and instrumentalities shown, wherein:

FIG. 3 illustrates an angled side vide of the PCB assembly of FIG. 2;

DETAILED DESCRIPTION OF THE INVENTION

The present embodiments are directed toward a coordinated system of printed circuit board (PCB) assemblies that display information, such as advertising and pricing information. Each individual PCB assembly may display a unit price, such as a price for a gallon of a particular type of gasoline or other product. Each individual PCB assembly may have a master plug-in light emitting diode (LED) module and multiple slave plug-in LED modules. The plug-in LED modules may be directly interconnected with plug-in back panel modules that may be attached to a module housing. In other embodiments discussed herein, the plug-in LED modules may be directly interconnected with power and control buses attached to the module housing. The module housing may be interconnected with a main power supply or a controller, or both. A remote controller may be configured to remotely and automatically change the price for each PCB assembly within the coordinated system. Each PCB assembly, slave module, or master module may include a dedicated processor and LEDs. Each PCB assembly may be configured to have male or female connectors to plug into corresponding female or male connectors on the plug-in back panel modules.

Additionally, the present embodiments include an electronic sign assembly that may display information, such as advertising and pricing information. The present embodiments are intended to eliminate drawbacks of conventional systems. For instance, gas stations owners may have concerns regarding changing their conventional static gas pricing information manually. The conventional plastic numbers that may be used to display the prices on the sign may be difficult to change, and may frequently fall, thus injuring the owner, attendant, or pedestrian.

Gas station owners may still refuse to convert to digital types of signs for various reasons. First, the available solutions on the market today may be expensive, which may be due to their method of installing the signs. For example, existing signs may require a change to an existing sign in order to embed the display inside it. This may present a significant cost of installation as opposed to a retrofit-install that the present embodiments may provide. Second, since most of the competitive displays may be embedded in the sign, such displays may require complex wiring and assembly, and, as such, may require a professional technician to maintain them. This may add concern to gas station owners who would have to pay for this professional service.

On the other hand, the present embodiments may remove these concerns as they may allow just about anybody to replace damaged panels or LED modules by simply unplugging the damaged one, and then plugging in a new one without touching any wires, nor having to ever dismantle the enclosures embedded inside the plastic of an existing sign. Also, the present embodiments may significantly reduce the cost of manufacturing and installation, along with future maintenance issues.

Figure 1A:
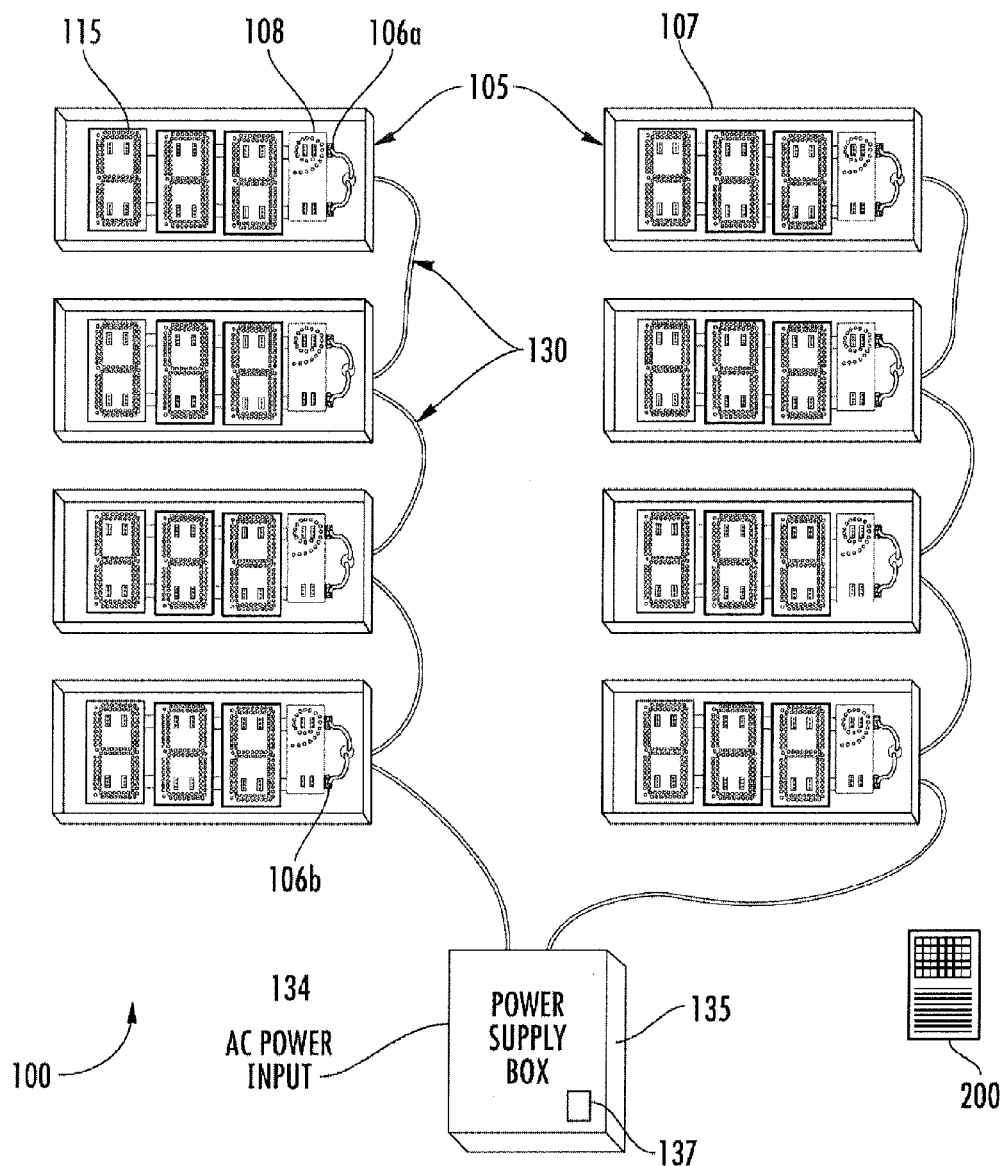
FIG. 1A illustrates an exemplary system connecting several printed circuit board (PCB) assemblies featuring a main power supply and a remote controller.

1. Embodiments Featuring Direct Attachment of Plug-In LED Modules to Plug-In Back Panel Modules Referring to FIGS. 1A and 2-9 and, in particular FIG. 1A, FIG. 1A illustrates an exemplary system 100 interconnecting several individual PCB assemblies 105 with a main power supply 135 and a remote controller 200. The system 100 may include complete PCB assemblies 105, housings 107, master plug-in LED modules 108, processors 109, a master plug-in back panel module 110, power and control buses 112, slave plug-in LED modules 115, slave plug-in back panel modules 116, cabling 130, an AC or DC power input 134, a main power supply 135, and a remote controller 200. The PCB assemblies 105 may be housed within the housings 107 to provide protection to the internal components and may include on/off switches to turn the PCB assemblies 105 on or off. Additionally, the system 444 may include additional, fewer, or alternate components. For example, the system 100 may include any number of PCB assemblies 105, power supplies 135, remote controllers 200, processors 109, memory, or various other devices or components. The processors 109, which may be optional, may be configured to execute instructions contained within the memory to execute various operations of functions disclosed herein.

Figure 2:
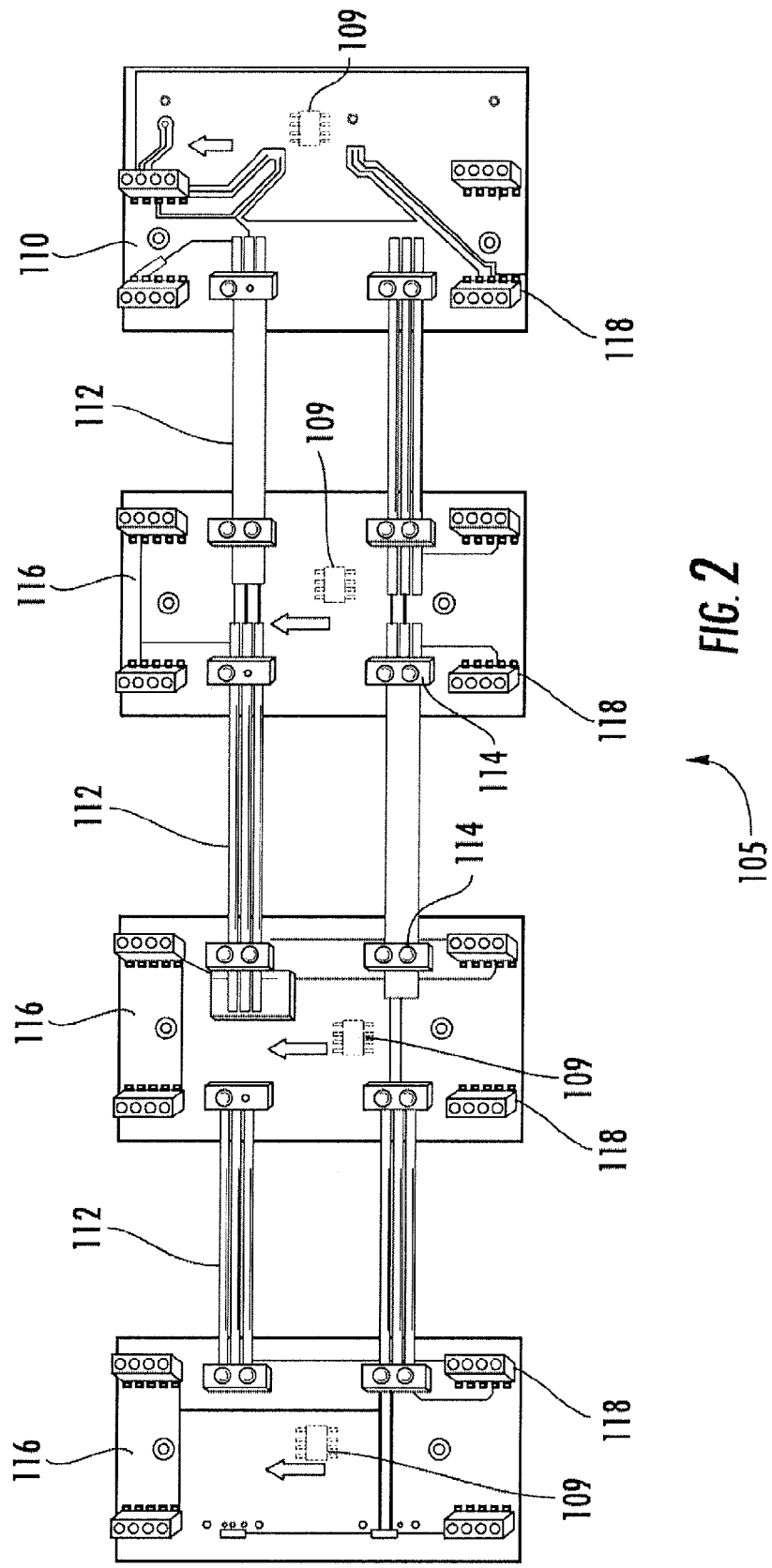
FIG. 2 illustrates an exemplary PCB assembly utilized in FIG. 1A or 1B that features exposed plug-in back panels without plug-in LED modules installed.
Figure 4A:
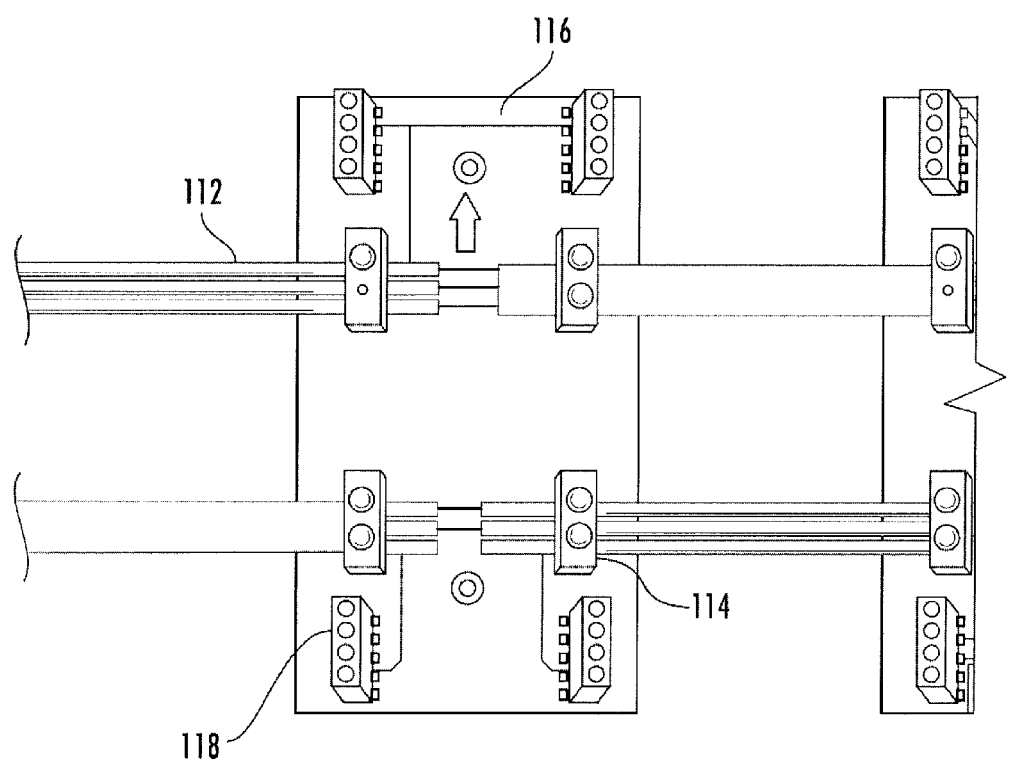
FIG. 4A illustrates a view of a plug-in back panel utilized in the PCB assembly of FIG. 2.
Figure 4B:
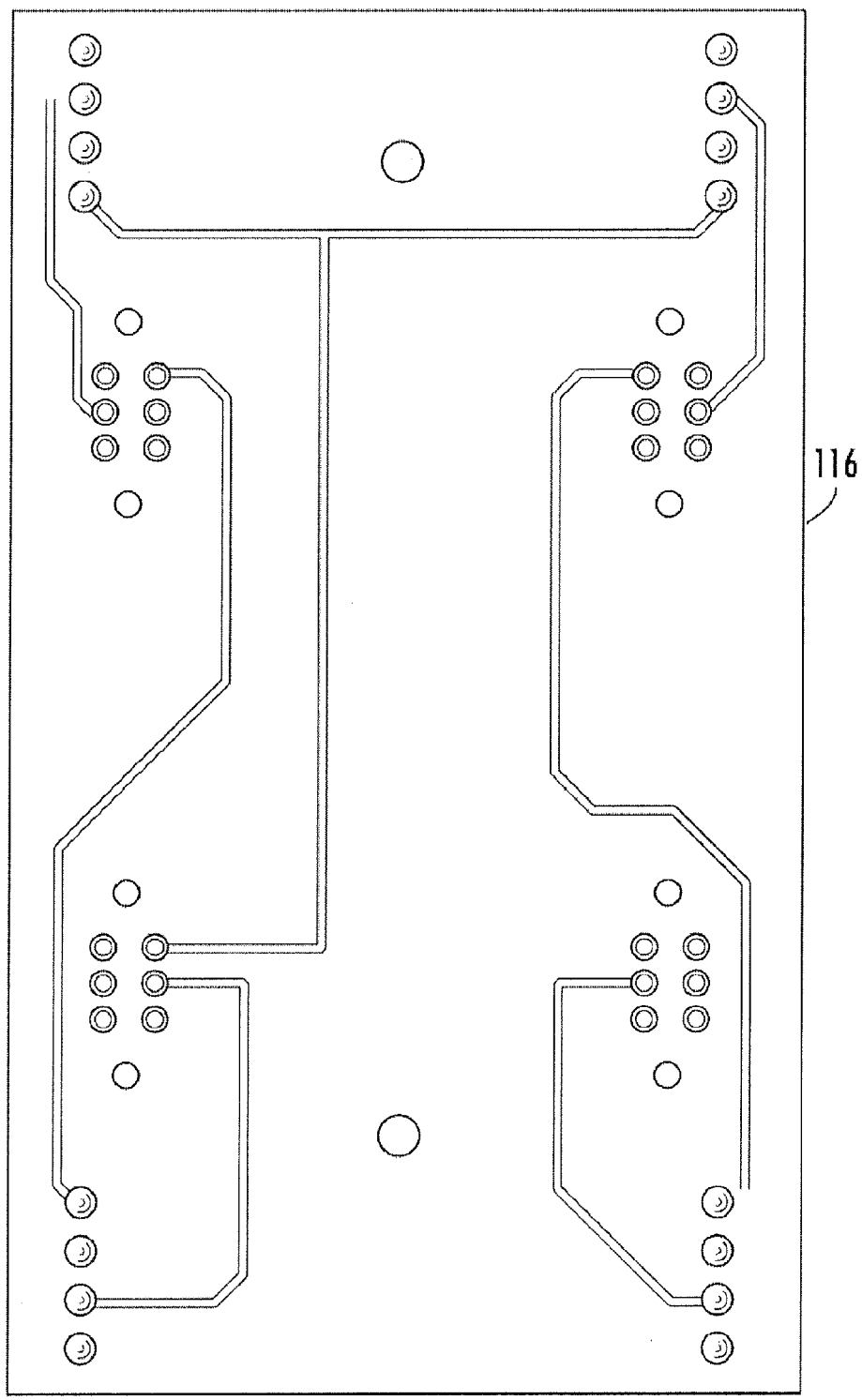
FIG. 4B illustrates a back view of the plug-in back panel of FIG. 4A.
Figure 5A:
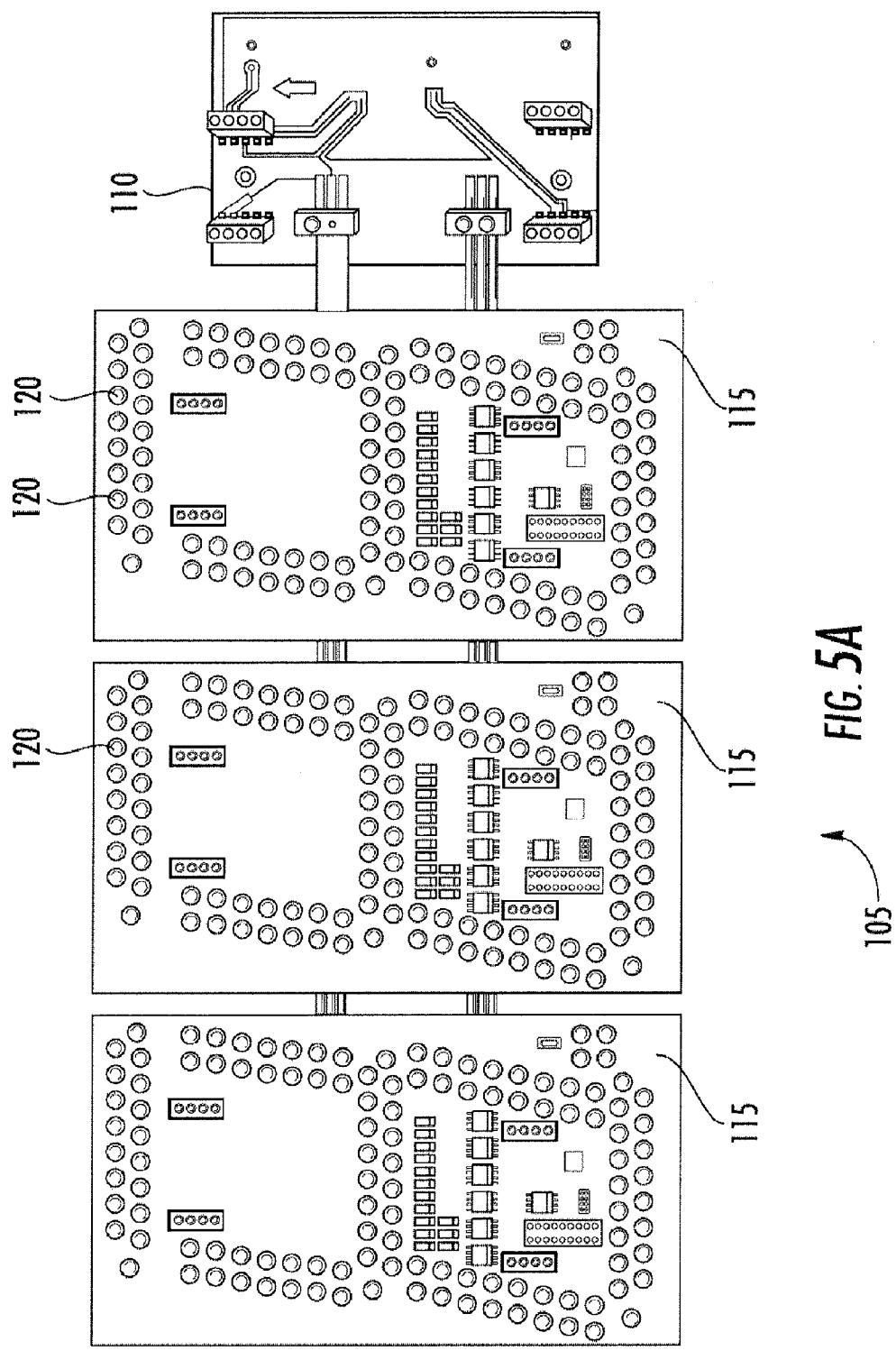
FIG. 5A illustrates three plug-in LED modules mounted to the PCB assembly of FIG. 2.
Figure 5B:
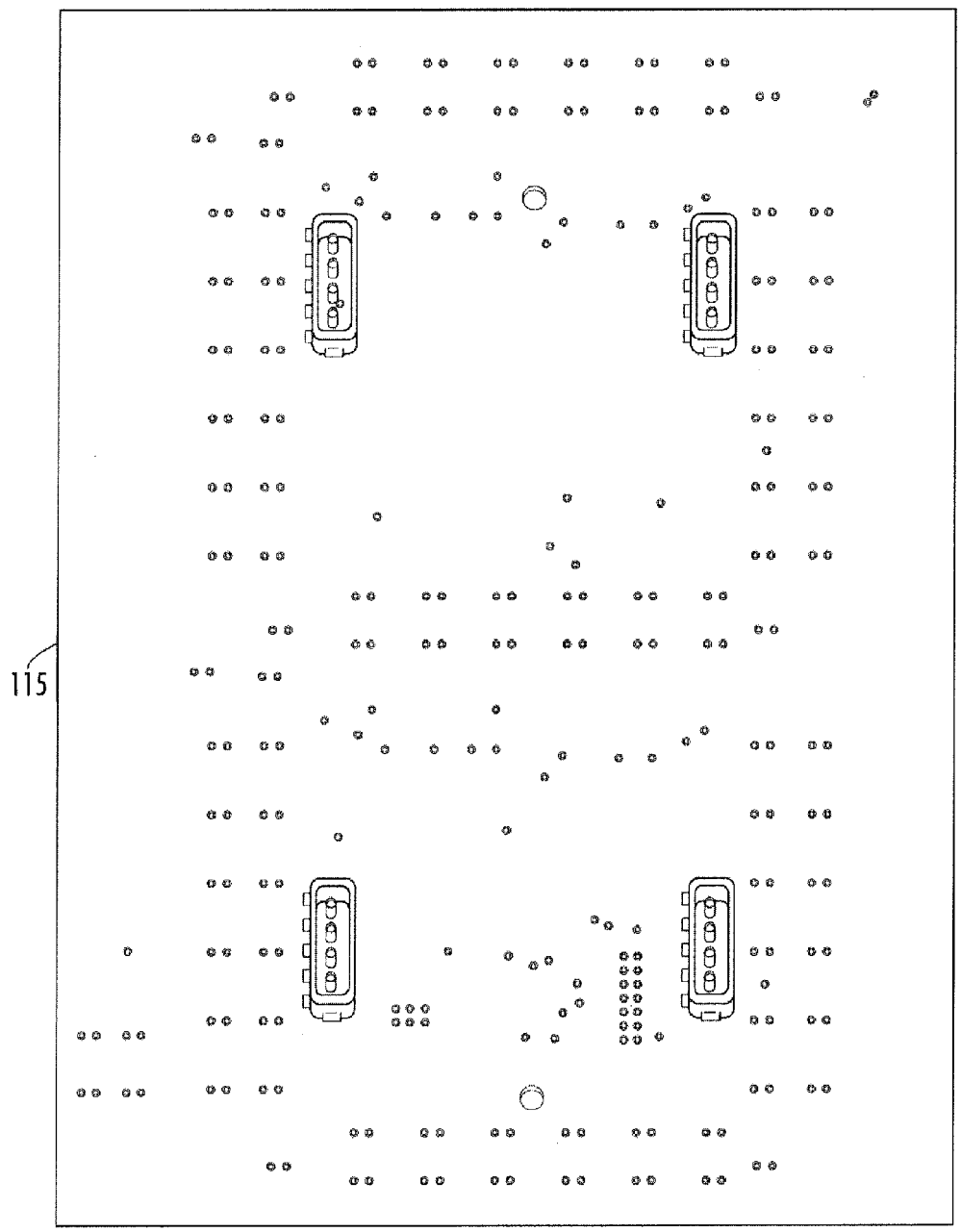
FIG. 5B illustrates the underside of one of the plug-in LED modules of FIG. 5A.
Figure 6:
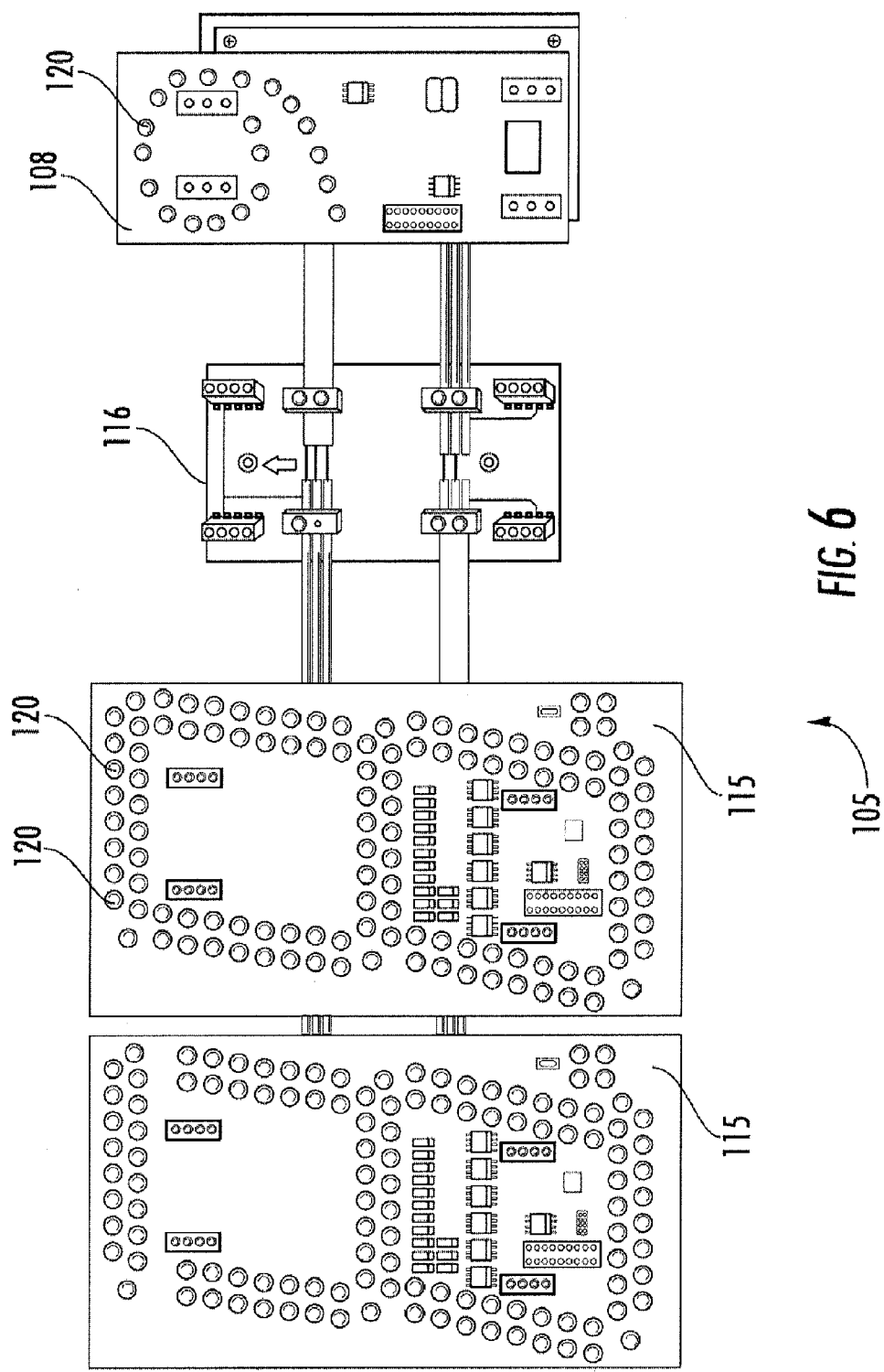
FIG. 6 illustrates a different set of three plug-in LED modules mounted to the PCB assembly of FIG. 2.
Figure 7:
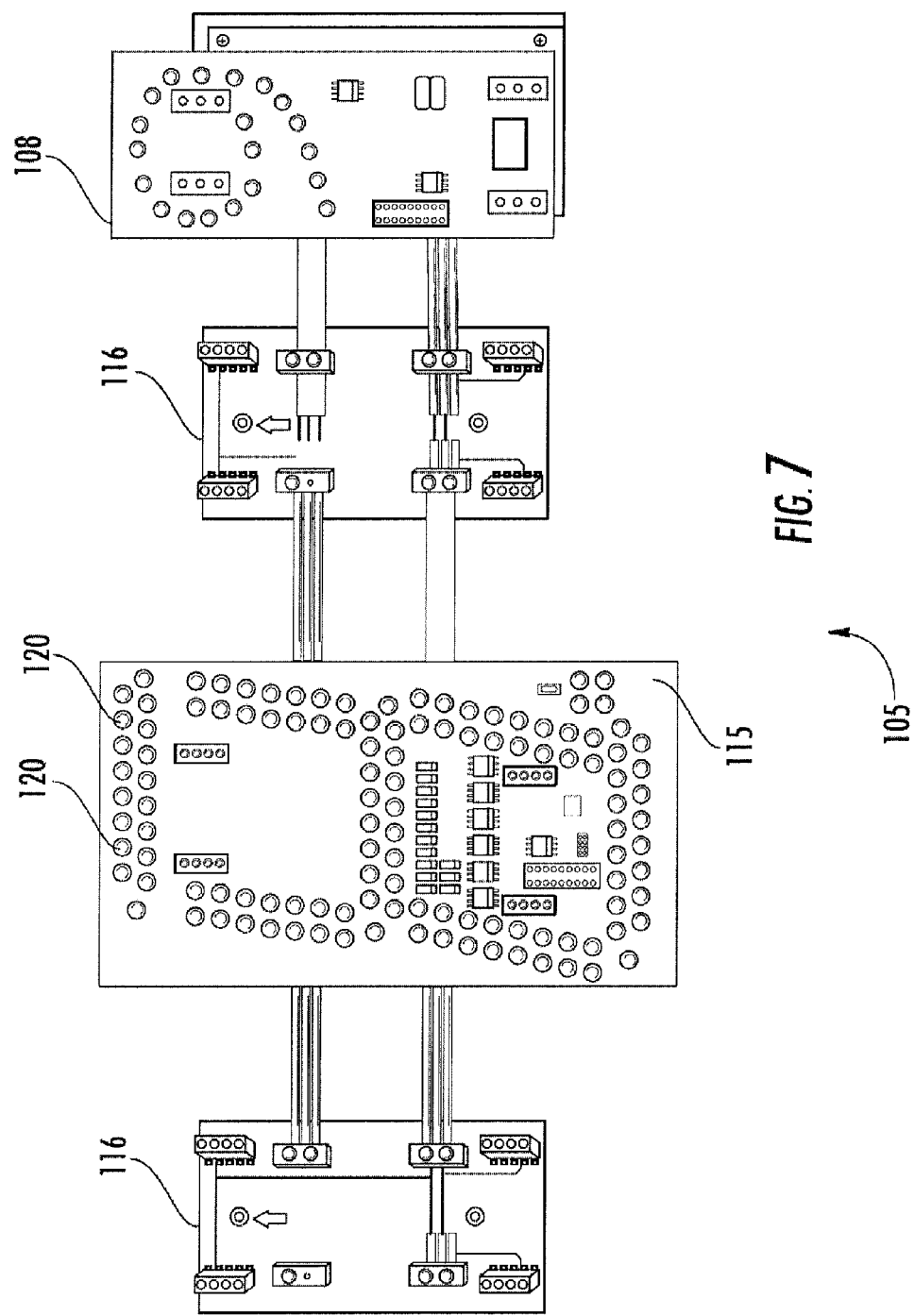
FIG. 7 illustrates two plug-in LED modules mounted to the PCB assembly of FIG. 2.
Figure 8:
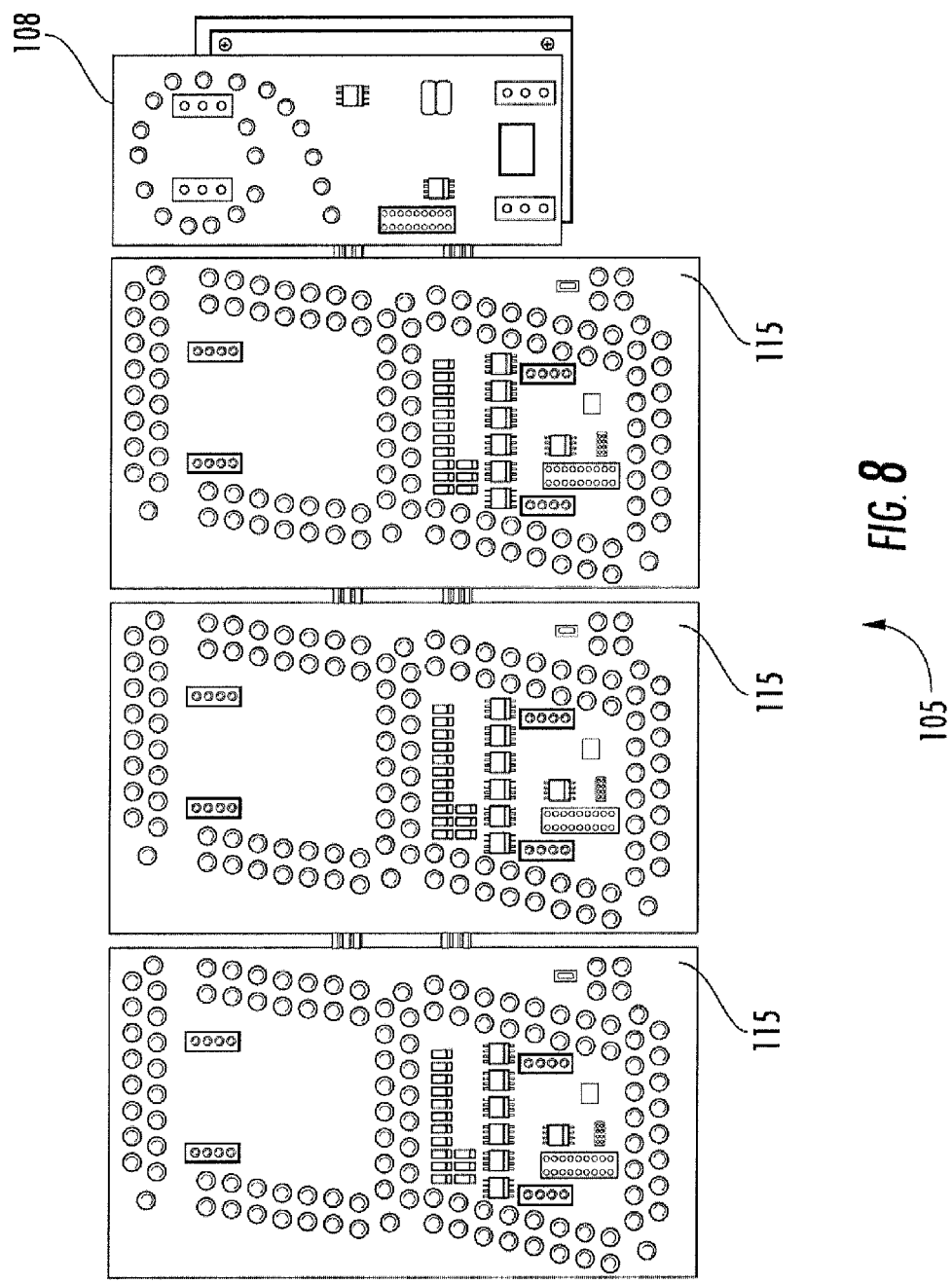
FIG. 8 illustrates an exemplary PCB assembly including four plug-in LED modules mounted on the PCB assembly of FIG. 2.

FIGS. 2-3 illustrate an exemplary PCB assembly 105 for displaying pricing information in the system 100 without plug-in LED modules 108, 115 connected to the PCB assembly 105. In one embodiment, as shown in FIG. 2, the PCB assembly 105 may be an assembly including one master plug-in back panel module 110 and three slave plug-in back panel modules 116. The master plug-in back panel module 110 and the three slave plug-in back panel modules 116 may be connected to one another via one or more power and control buses 112. In one embodiment, the master plug-in back panel module 110 and the three slave plug-in back panel modules 116 may be connected to the power and control buses 112 by using bus connectors 114 and may be configured to be connected without additional wiring or cables. By allowing direct connection to the power and control buses 112, the PCB assembly 105 may minimize the amount of components and wiring in the PCB assembly 105, which may allow a user to easily access the PCB assembly 105 without significant hassle. In another embodiment, the master plug-in back panel module 110 and the three slave plug-in back panel modules 116 may be circuit boards that include wiring, circuitry, one or more processors 109, computer memory, and connectors 118.

The master plug-in back panel module 110 of the system 100 may be configured to control the slave plug-in back panel modules 116. For example, the master plug-in back panel module 110 may be configured to receive power and control data over the power and control buses 112 and/or via the cabling connectors 106a and 106b. The power and control buses 112 and the cabling connectors 106a and 106b may interconnect with the main power supply 135 and/or the remote controller 200 to receive the power and control data respectively. Additionally or alternatively, the master plug-in back panel module 110 may include a receiver and receive control data sent via a remote controller 200 using wireless communication technology. In one embodiment, the master plug-in back panel module 110 may relay power and control data to the slave plug-in back panel modules 116, such as via the power and control buses 112. The master plug-in back panel module 110 may be connected to the power and control buses 112 using the bus connectors 114. In one embodiment, the bus connectors 114 may include holes configured to receive screws to secure the power and control buses 112 to the master plug-in back panel module 110. Furthermore, the connectors 118 of the master plug-in back panel module 110 may be configured to operate as a connection point for providing power and control data to a master plug-in LED module 108 when the master plug-in LED module 108 is connected to the connectors 118. In one embodiment, the connectors 118 may be female or male connectors that can be configured to receive pins or mate with female connectors of the master plug-in LED module 108 respectively.

The slave plug-in back panel modules 116 of the system 100 may be configured to be controlled by the master plug-in back panel module 110 and also may be configured to receive power and control data from the master plug-in back panel module 116 or directly from the power supply 135 and the controller 200. Also, the connectors 118 of the slave plug-in back panel modules 116 may be configured to operate as a connection point for providing power and control data to slave plug-in LED modules 115 when the slave plug-in LED modules 115 are connected to the connectors 118. In one embodiment, the slave plug-in back panel modules 116 may be connected to one another and to the master plug-in back panel module 110 via the power and control buses 112 by using bus connectors 114. The bus connectors 114 may include holes for receiving screws to secure the power and control buses 112 to the slave plug-in back panel modules 116. In one embodiment, the connectors 118 may be female or male connectors that can be configured to receive pins or mate with female connectors of the slave plug-in LED modules 115 respectively.

In addition to the master plug-in back panel module 110 and the slave plug-in back panel modules 116, the system 100 may include a master plug-in LED module 108. The master plug-in LED module 108 may include several LEDs 120 configured to display pricing, advertising, or other information. Additionally, the master plug-in LED module 108 may include wiring, circuitry, one or more processors, one or more male or female electrical plug-in connectors, and/or other components. The master plug-in LED module 108 may be plugged into the master plug-in back panel module 110 using pins or other types of connectors to connect to the connectors 118 of the master plug-in back panel module 110. When plugged in, the master plug-in LED module 108 can receive power and control data from the power and control buses 112, the master plug-in back panel module 110, the controller 200, and/or the power supply 135. In one embodiment, the master module 404 may be configured to have LEDs 120 arranged in a figure-nine pattern to display the number nine using the LEDs 120 as illustratively shown in FIGS. 6-8. In one embodiment, the master plug-in LED module 108 may be configured to control the slave plug-in LED modules 115. For example, the master plug-in LED module 108 may receive power and control data over the power and control buses 112 and relay the power and control data/signals to the slave plug-in LED slave modules 115. Additionally or alternatively, the master plug-in LED module 108 may include a receiver and receive control data sent via controller 200 using wireless communication.

The slave plug-in LED modules 115 may include several LEDs 120 configured to display pricing, advertising, or other information. Also, the slave plug-in LED modules 115 may include wiring, circuitry, one or more processors, one or more male or female electrical plug-in connectors, and/or other components. The slave plug-in LED modules 115 may be plugged into the slave plug-in back panel modules 116 using pins or other types of connectors to connect to the connectors 118 of the slave plug-in back panel module 116. When plugged in, the slave plug-in LED modules 115 can receive power and control data from the power and control buses 112, the master plug-in back panel module 110, the controller 200, and/or the power supply 135. In one embodiment, the slave plug-in LED modules 115 may be configured have LEDs 120 arranged in a figure-eight pattern so that the slave plug-in LED modules 115 may display various numbers or letters using the LEDs 120 as illustratively shown in FIGS. 5-8. Additionally or alternatively, the slave plug-in LED module 115 may include a receiver and receive control data sent via controller 200 using wireless communication, data sent by the master plug-in LED module 108, or data sent by the master plug-in back panel module 110.

The power and control buses 112, which may be utilized to deliver power and control signals to the various components in the system 100, may include conductive pathways that may transmit the power and control signals to the various components of the system 100. By using the conductive pathways, the power and control buses 112 do not need to utilize traditional wiring to relay power and control signals. Additionally, the width and/or length of power and control buses 112 may be adjusted such that the plurality of slave plug-in back panel modules 116 and the master plug-in back panel module 110 may be connected to each other at varying distances. Furthermore, as noted herein, the power and control buses 112 may be connected to the slave plug-in back panel modules 116 and the master plug-in back panel module 110 by using connectors 114. The connectors 114 may include holes through which screws may be inserted to secure the modules 116 and 110 in place.

The power supply 135 may be configured to provide power to the various components in the system by utilizing an AC or DC input 134 or outlet. The power may be supplied to the components in the system 100 via the cabling 130, which may be attached to the cabling connectors 106a and 106b to provide the power. Additionally, the power supply 135 may be configured to communicate with the controller 200 and can relay control signals received from the controller 200 to the various components of the system 100. Other arrangements, including other power supplies and controllers, may be used.

Figure 9:
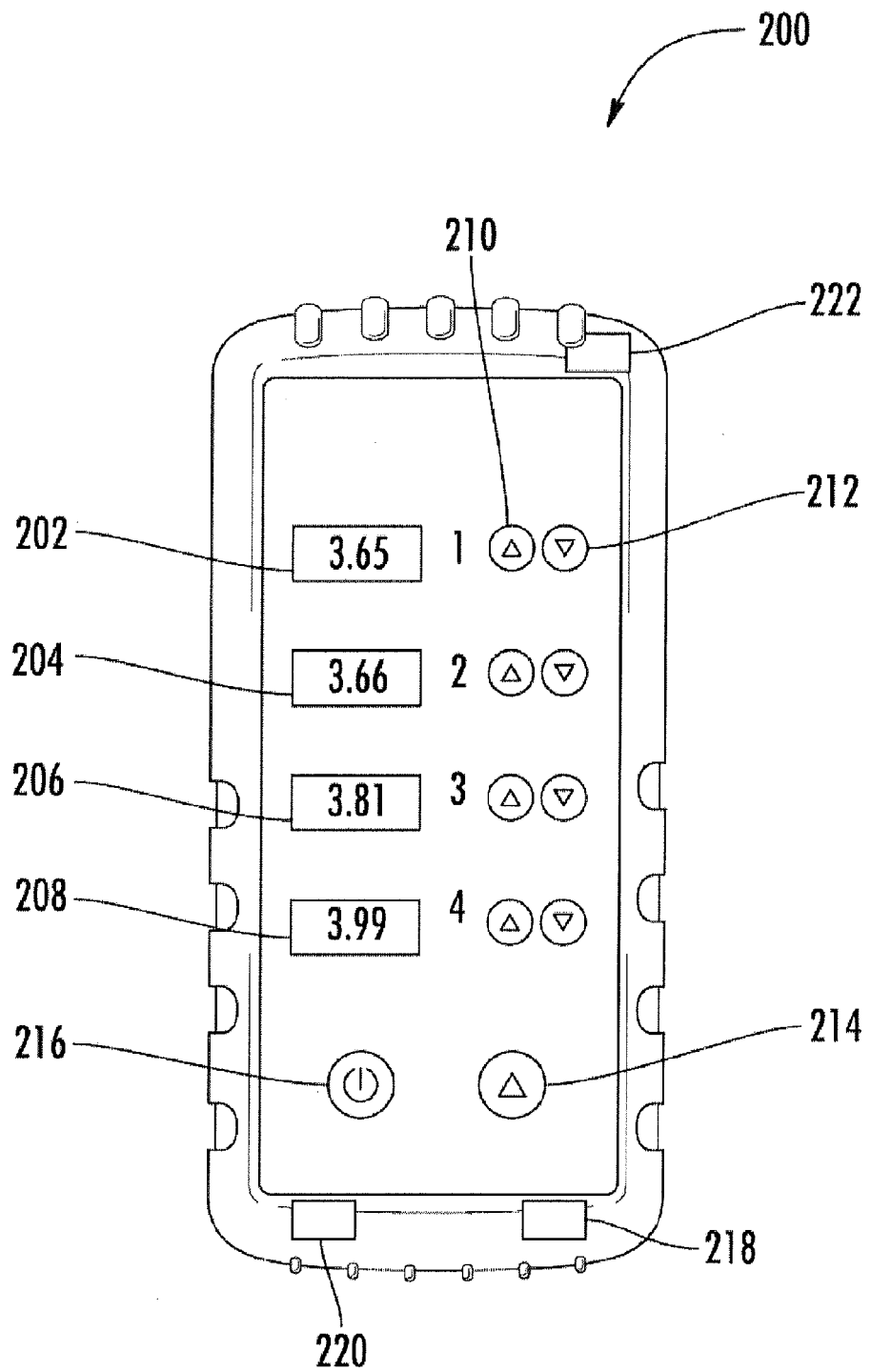
FIG. 9 illustrates an exemplary remote controller for remotely changing information.

FIG. 9 illustrates an exemplary remote controller 200 for remotely changing advertising or pricing information for the PCB assemblies 105. The remote controller 200 may include a display or interface displaying pricing information 202, 204, 206, 208, up and down buttons 210, 212, a set button 214, and a power button 216. The remote controller 200 may include additional, fewer, or alternate components.

For instance, the remote controller 200 may include a processor 218 and a memory 220. The processor 218 may be run instructions stored in the memory 220. The remote controller 200 may include a transceiver or a transmitter 222 to wirelessly communicate with a local power supply and/or controller 135, 137 that is located in the vicinity of or hardwired to one or more PCB assemblies 105 (such as depicted in FIG. 1A).

The remote controller 200 may include a battery for powering its components, such as the processor 218 and transmitter 222. The power button 216 may turn on or turn off the remote controller 200 or even the PCB assemblies 105. When the remote controller 200 is turned on, one or more displays 202, 204, 206, and 208 may show pricing information, such as the pricing information for a gallon of regular gasoline 202, unleaded gasoline 204, premium gasoline 206, and/or ultra-premium or diesel gasoline 208.

The up buttons 210 and down buttons 212 may be used to increase or decrease each price displayed. For instance, the up button 210 may change the "365" shown (representing $3.65) upward by increments of one, such as to "366", and then to "367", and so on. The down button 212 may change the "365" shown downward by increments of one, such as to "364", then to "363", and so on.

Once the desired pricing information has been entered by the user, the set button 214 may be pressed to transmit control data to local receiver and/or controller 137 associated with a coordinated system of interconnected PCB assemblies 105. After which, the local controller(s) 137 may change pricing information displayed by several PCB assemblies to the pricing information set via the remote controller 200.

Using FIG. 9 to help illustrate, each individual number in a price of a product for sale may be individually set via the remote controller 200. For instance, the "365" pricing information 202 may be increased to "470" or decreased to "258" using the remote controller 200 and the up and down buttons 210, 212.

Operatively, a user can utilize the system 100 to adjust pricing information or other types of information associated with a particular product, service, or anything else. The user may activate the controller 200 using the power button 216 and can adjust information displayed on the PCB assemblies 105 using the up and down buttons 210 and 212. In order to adjust the information, the user can press the up and down buttons 210 and 212 to select an appropriate number or letter and hit the set button 214 to set the number or letter for a particular PCB assembly 105. The controller 200 can transmit a control signal to the power supply 135 that includes the selected number or letter. If, for example, the user sets a first PCB assembly 105 to the value "365" and sets the value of a second PCB assembly to the value "366," the controller 200 can transmit a control signal to the power supply 135 including the set information. The power supply 135 can then relay the control signal including the set information to the appropriate PCB assemblies 105. For example, the first PCB assembly 105 may receive the control signal and may adjust the information displayed on the first PCB assembly 105 to display the value "365" using the LEDs 120 on the plug-in LED modules 115 on the first PCB assembly 105. Similarly, the second PCB assembly 105 may receive the control signal and may adjust the information displayed on the second PCB assembly 105 to display the value "366" using the LEDs 120 on the plug-in LED modules 115 on the second PCB assembly 105. In one embodiment, the controller 200 can send control signals directly to the PCB assemblies 105 without having to send the control signal to the power supply 135 first.

If, for example, a plug-in LED module 108 or 115 fails, the plug-in LED module 108 or 115 can be replaced with a new plug-in LED module 108 or 115 by unplugging the failed plug-in LED module 108 or 115 from a plug-in back panel module 110 or 116 that the failed plug-in LED module 108 or 115 is currently plugged into. Then, the new plug-in LED module 108 or 115 may be plugged into the plug-in back panel module 110 or 116 that the failed plug-in LED module 108 or 115 was previously plugged into. In one embodiment, failed plug-in LED modules 108 or 115 may be replaced without requiring electrical wiring maintenance to disconnect the failed plug-in LED module 108 or 115 from wiring associated with the controller 200 or power supply 135 and connecting the new plug-in LED module 108 or 115 to the wiring associated with the controller 200 or power supply 135.

Figure 10:
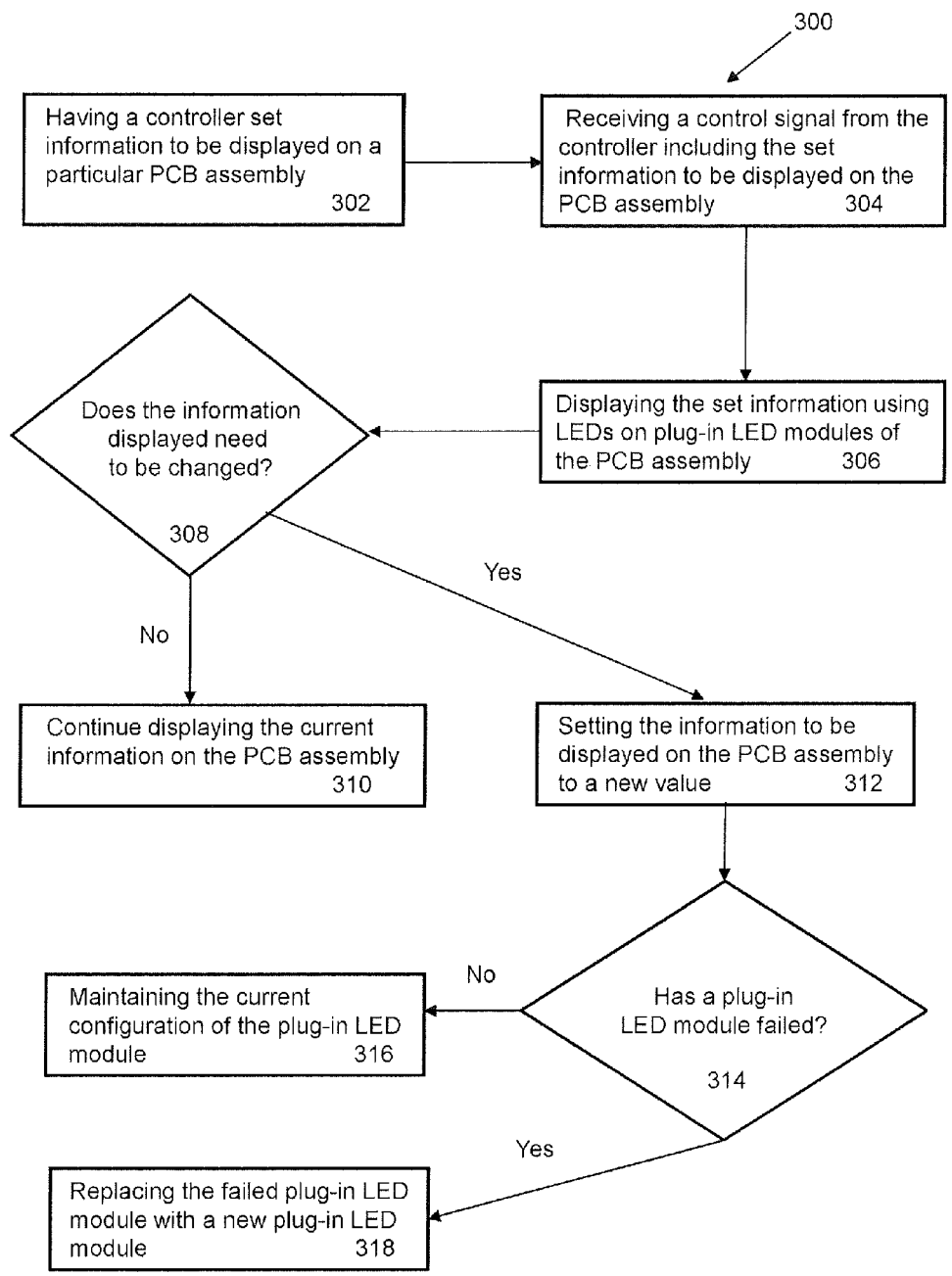
FIG. 10 illustrates an exemplary method for using a PCB assembly for adjusting information.

Referring now also to FIG. 10, an exemplary method 300 for using a PCB assembly 105 for displaying information is provided. The method 300 may include, at step 302, having a controller 200 set information to be displayed for a particular PCB assembly 105. At step 304, the method 300 may include receiving a control signal from the controller 200 including the set information to be displayed on the PCB assembly 105. The control signal may be first received by a local receiver and/or controller 137 of the power supply 135, and the controller 137 may forward the control signal to the PCB assembly 105. Once the control signal is received from the controller 200, the processors 109 of the PCB assembly or other components of the PCB assembly 105 can cause the master and slave plug-in LED modules 108 and 115 to display the set information using the LEDs 120 based on the control signal at step 306.

At step 308, the method 300 may include determining whether the information needs to be changed again. If the information does not need to be changed, the method 300 may include continuing to display the current information on the PCB assembly 105 at step 310. However, if the information needs to be changed again, the method 300 may include setting the information to be displayed on the PCB assembly 105 to a new value by using the controller 200 and sending a new control signal to the PCB assembly 105 to display the new information at step 312. At step 314, the method 300 may include determining if a plug-in LED module 108 or 115 has failed. If the plug-in LED module 108 or 115 has not failed, the method 300 may include maintaining the current configuration of the PCB assembly 105. However, if the plug-in LED module 108 or 115 has failed, the method 300 may include replacing the failed plug-in LED module 108 or 115 with a new plug-in LED module 108 or 115 so that the information may be displayed accurately at step 318. The new plug-in LED module 108 or 115 may be placed in the plug-in back panel module 110 or 116 that the failed plug-in LED module 108 or 115 was previously plugged into.

The method 300 may also include adjusting a length of the power and control buses 112 such that the plug-in back panel modules 110 or 116 may be connected to each other via the power and control buses 112 at varying distances. It is important to note that the methods described above and below may incorporate any of the functionality, devices, or features of the systems described above, below, or otherwise, and are not intended to be limited to the description or examples provided herein,

2. Embodiments Featuring Direct Attachment of Plug-In LED Modules to the Power and Control Buses In one embodiment and referring to FIGS. 11-16, a PCB assembly for displaying changeable advertising information may include two power and control buses mounted horizontally and one above the other within a housing. The two power and control buses may be configured to carry (1) power from a main power supply, and (2) control signals from a remote or other controller to a top set and a bottom set of female connectors (or male pins) attached to the two power and control buses.

The PCB assembly may also include a plurality of plug-in and/or replaceable LED modules. Each of the plurality of plug-in LED modules may be independently controllable by the remote or other controller, and have circuitry and LEDs configured to display advertising information. Each of the plurality of plug-in LED modules further may have a top set and a bottom set of male pins (or female connectors) sized to be compatible with the top set and the bottom set of female connectors (or male pins) on the two power and control buses, respectively. As a result, each of the plurality of plug-in LED modules may be individually plugged into, and removed from, the two power and control buses. The controller may be configured to remotely change the advertising information being displayed by the plurality of plug-in LED modules, such as via wireless communication.

Upon electrical or mechanical failure of one of the plurality of plug-in LED modules, the failed one of the plurality of plug-in LED modules may be replaced with a new plug-in LED module solely by unplugging the failed one of the plurality of plug-in LED modules from the two power and control buses and then plugging in the new plug-in LED module to the two power and control buses (or female or male connectors interconnected with the power and control buses) such that the PCB assembly may once again display complete advertising information.

In another embodiment, a printed circuit board (PCB) assembly for displaying changeable advertising information may include a housing, and one or more power and control buses mounted within the housing, such as horizontally or vertically. The power and control bus or buses may be configured to carry power and control signals to a plurality of top and/or bottom pairs of female (or male) connectors interconnected with the power and control bus.

The PCB assembly may include a plurality of plug-in LED modules. Each of the plurality of plug-in LED modules may be independently controllable by a remote or other controller, and have circuitry, LEDs, or both, configured to display advertising information. Each of the plurality of plug-in LED modules may further have a top set and a bottom set of male pins (or female connectors) sized to be compatible with a top and bottom pair of female connectors (or male pins), respectively. As a result, each of the plurality of plug-in LED modules may be individually plugged into, and removed from, the power and control bus or buses (or female or male connectors/pins interconnected with the power and control bus or buses). The remote or other type of controller may be configured to change the advertising information being displayed by the plurality of plug-in LED modules, such as via wireless communication.

Upon electrical or mechanical failure of one of the plurality of plug-in LED modules, the failed one of the plurality of plug-in LED modules may be replaced with a new plug-in LED module solely by unplugging the failed one of the plurality of plug-in LED modules from the corresponding top and/or bottom pair of female connectors (or male pins) and then plugging in the new plug-in LED module to the corresponding top and/or bottom pair of female connectors (or male pins) on the power and control bus or buses such that the PCB assembly may once again display complete advertising information. In one preferred embodiment, the information displayed by the LED modules comprises a price of gasoline.

In general, the present embodiments include a PCB assembly for displaying changeable advertising information. The PCB assembly may include one or more power and control buses mounted horizontally within a housing. The power and control buses may be configured to carry (1) power from a power supply, and (2) control signals from a controller to one or more female (or male) connectors attached to the power and control buses.

The PCB assembly may include a plurality of plug-in LED modules. Each of the plurality of plug-in LED modules may be independently controllable by the controller, and have circuitry and LEDs configured to display advertising information. Each of the plurality of plug-in LED modules may also have one or more male (or female) connectors sized to be compatible with the one or more female (or male) connectors electrically interconnected with the power and control bus or buses respectively. As a result, each of the plurality of plug-in LED modules may be individually plugged into, and removed from, each of the power and control buses.

The controller may be configured to change the information being displayed by the plurality of plug-in LED modules. In one embodiment, the controller is a remote controller configured to remotely and individually control and change each number, letter, or other information displayed by each of the plug-in LED modules. For instance, the remote controller may allow a user to enter a three or four digit price for several different types of gasoline via up and down buttons. Then, the remote controller may wireless transmit the new pricing and control information to a receiver associated with a system of interconnected PCB assemblies having plug-in LED modules. Alternatively, the controller may be hard wired to the plurality of PCB assemblies having plug-in LED modules.

Upon electrical or mechanical failure of one of the plug-in LED modules, the failed plug-in LED module may be replaced with a new plug-in LED module solely by unplugging the failed plug-in LED module from the female or male connectors interconnected with the one or more power and control buses. Then, the new or replacement plug-in LED module may be plugged into the female or male connectors interconnected with the one or more power and control buses such that the PCB assembly may once again display complete advertising information, such as a complete price of a gallon of gasoline.

As a result, the replacement of the failed plug-in LED module with the new plug-in LED module may be accomplished without requiring electrical wiring maintenance to first un-connect the failed plug-in LED module from wiring of the controller and/or power supply, and then connect the new plug-in LED module to the wiring of the controller and/or power supply. In one preferred embodiment, the advertising information presented by a plurality of plug-in LED modules can be a price of gasoline.

In one aspect, the PCB assemblies may have bus work and plug-in LED modules with mating connectors. As a result, the single digit LED panels or modules may effortlessly plug into the control data and power buses. A complete PCB assembly may be a single permanent fixture that will connect to four independent digit intelligent LED panels. The power and control signals may be sent to PCB assembly mating connectors located at one end of the control and power buses.

The independent digit intelligent LED panels may each contain all of the necessary circuitry and LEDs to operate a LED electronic sign. Each LED panel or module may emit a single numerical digit, have its own complete electronic and logic control circuitry, and have a quick disconnect mating connector which may be innovative in the electronic sign industry.

The present embodiments may provide pricing or LED panel modules that may be easy to change out and lend themselves to simply serviceability. Each module may include a circuit board with one or more LEDs. The modules may be configured to have four corner connectors in one embodiment. Each corner connector may connect to a power and/or data bus.

In one embodiment, the system may include two horizontal power and data buses affixed to the back of a housing enclosure. The plug-in LED panel modules may then be affixed to power and data buses for vertical support. A cover may be slide over the modules, such as to provide protection from adverse weather conditions.

A remote controller may allow a user to enter numerous prices, such as four gas prices. For instance, regular, unleaded, super unleaded, premium, diesel, or other gas prices may be entered via a control board on the remote controller. Then, the remote controller may transmit the prices entered via a signal, such as a RF signal. A receiver on the main power supply may receive the signal and relay the pricing information received to the modules. As a result, a user may quickly and easily change the displayed pricing information for numerous kinds of gas, with each kind of gas having a different price, via a remote controller and the transmission of a single signal. In one embodiment, the remote controller is configured to remotely change four prices at once.

Each PCB assembly may include a master plug-in LED module and three slave plug-in LED modules. The master module may function as a local brain. The present embodiments may be used as a retrofit kit to update existing signs. Control and power bus work and the pricing or plug-in LED modules may be mounted into a box structure, which in turn may be mounted upon an existing sign. The box structure may be customized to fit over the existing sign with little to no overlap. The retrofit kit may include two power and data buses that are mounted to the back of the box structure. The pricing or LED modules may then be affixed to the buses. For instance, the plug-in LED modules may include connectors that include pins that fit into corresponding holes on connectors that are connected to the buses.

Prior art systems may be expensive to install and maintain, and require a dedicated worker or professional technician or electrician to repair. On the other hand, the present embodiments may include a slidable cover, and require little to no service or maintenance.

Figure 11:
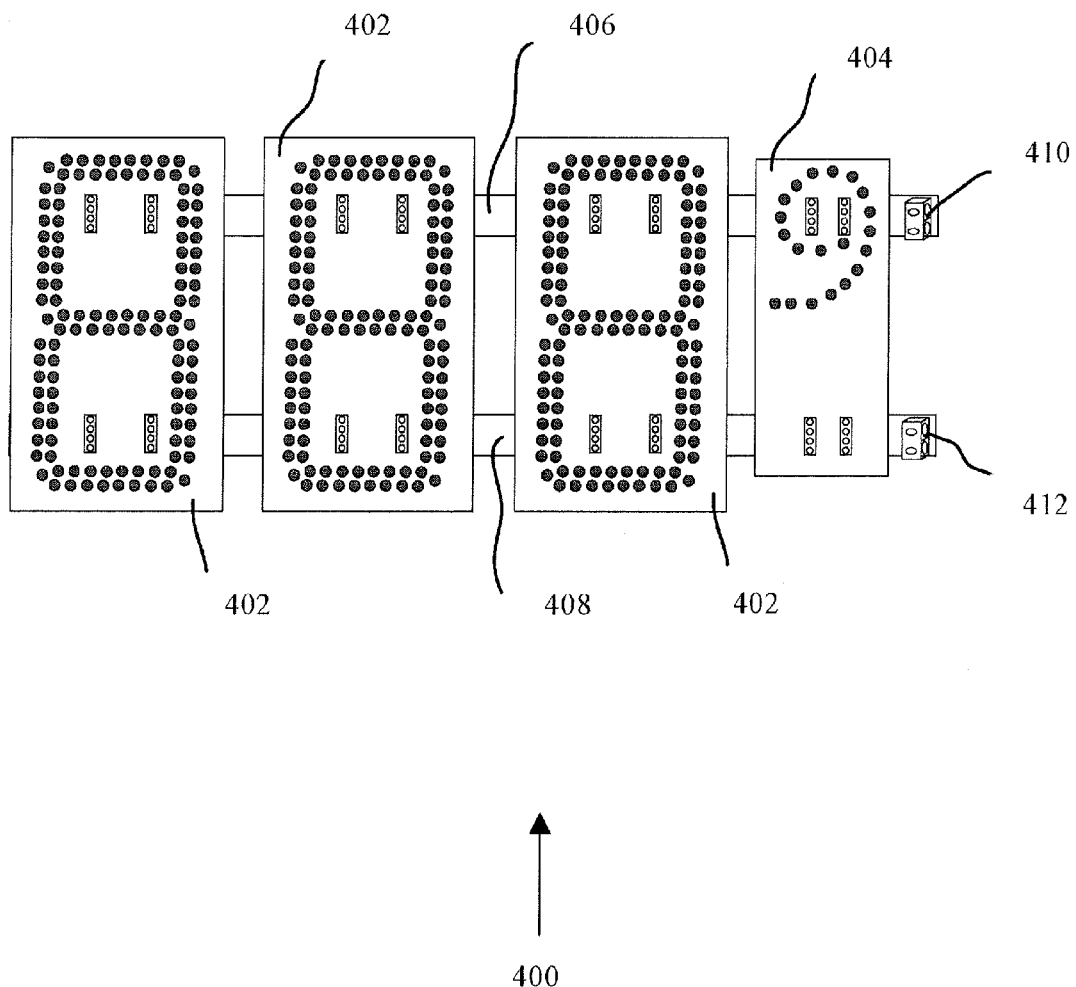
FIG. 11 illustrates an exemplary PCB assembly for displaying advertising or pricing information of the present embodiments.

FIG. 11 illustrates an exemplary PCB assembly 400 for displaying pricing information. The PCB assembly 400, in one aspect, may be an assembly of four independent digit and intelligent plug-in LED modules/panels that are each plugged onto a circuit board. The PCB assembly 400 may include plug-in LED slave modules 402, a master plug-in LED module 404, power and control buses 406, 408, and cabling connectors 410, 412. The PCB assembly may include additional, fewer, or alternate components.

Each plug-in LED slave module 402 may include a circuit board on which is mounted several LEDs. The LEDs may be in the shape of a character or number. For instance, the LEDs may outline a number eight such as each number, one through nine, may be displayed via a controller controlling the LEDs. Each plug-in LED slave module 402 may include wiring, circuitry, one or more processors, one or more male or female electrical plug-in connectors, and/or other components. In one embodiment, each PCB assembly 400 may include three plug-in slave LED modules 402 to display a price, such as a price of gasoline.

Each PCB assembly 400 may have a master plug-in LED module 404. The master module 404 may include several LEDs configured to display pricing or advertising information. In one embodiment, the master module 404 may be configured to display the number nine using the LEDs. The master module 404 may include wiring, circuitry, one or more processors, one or more male or female electrical plug-in connectors, and/or other components.

In one embodiment, the master plug-in LED module 404 may be configured to control the plug-in LED slave modules 402. For example, the plug-in LED master module 404 may receive power and control data over one or more control and power buses 406, 408. The control and power buses 406, 408 may have connectors 410, 412 that interconnect with a main power supply 446 and/or controller 450. Additionally or alternatively, the master plug-in LED module 404 may include a receiver and receive control data sent via a remote controller 450 via wireless communication. The master plug-in LED module 404 may relay power and control data received to the plug-in LED slave modules 402, such as via the control and power buses 406, 408.

Figure 12:
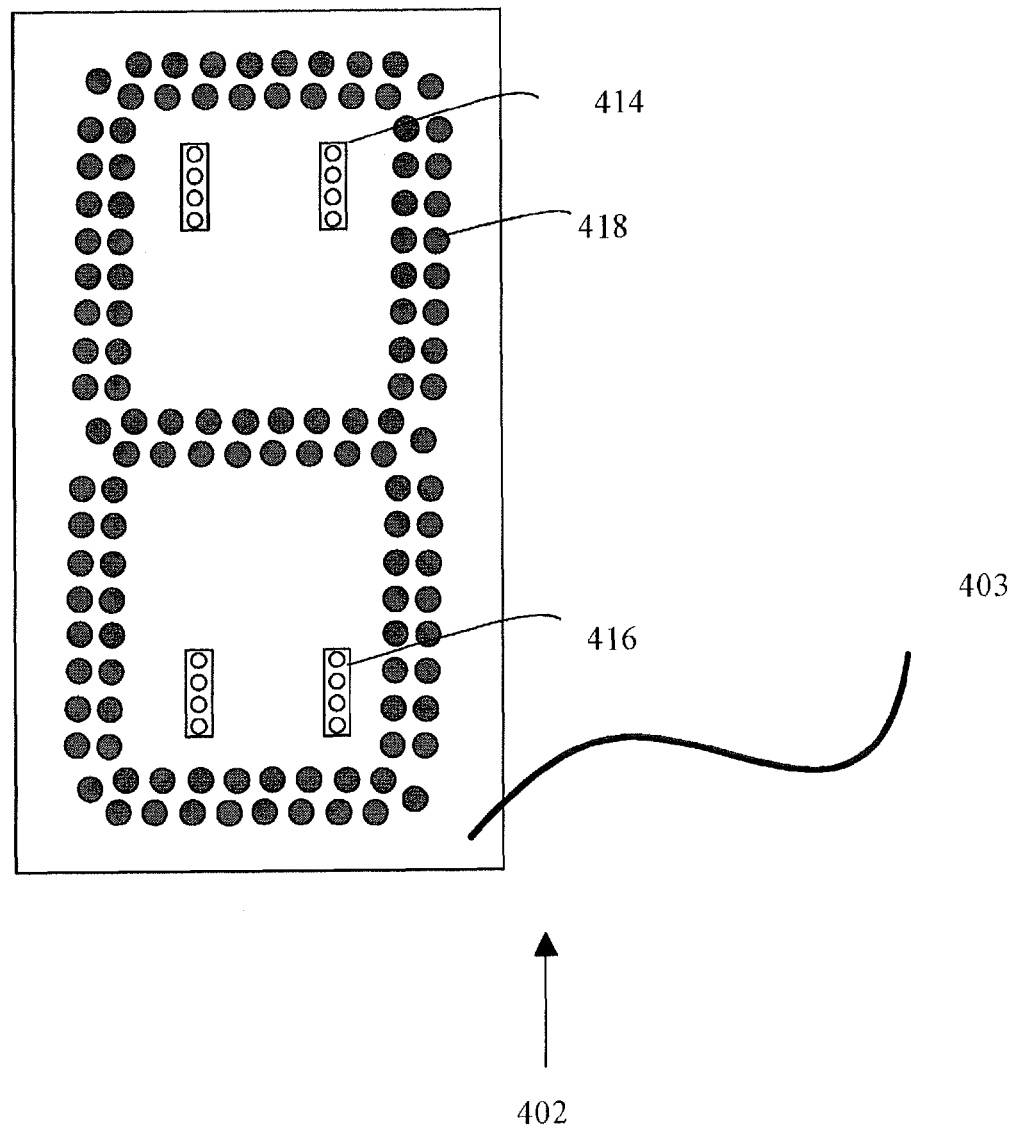
FIG. 12 illustrates an exemplary slave plug-in LED module of the exemplary PCB assembly of FIG. 11.

FIG. 12 illustrates an exemplary plug-in LED slave module 402 of the exemplary PCB assembly 400 of FIG. 11. The plug-in LED slave module 402 may include a printed circuit board backing 403, LEDs 418, and top and bottom connectors 414, 416. The plug-in LED slave module 402 may include additional, fewer, or alternate components.

In one aspect, the plug-in LED slave module 402 may display an independently controllable character or number. The plug-in LED slave module 402 may also be a plug-in LED panel or module. The plug-in LED slave module 402 may include several LEDs 418 that may be controlled to display partial or complete pricing or advertising information, such as a single digit. The plug-in LED slave module 402 may include one or more top electrical connectors 414 and one or more bottom electrical connectors 416. The electrical connectors 414, 416 may be male or female connectors configured or sized to mate with corresponding female or male connectors 420, 422 on a control data and power bus.

Figure 13:
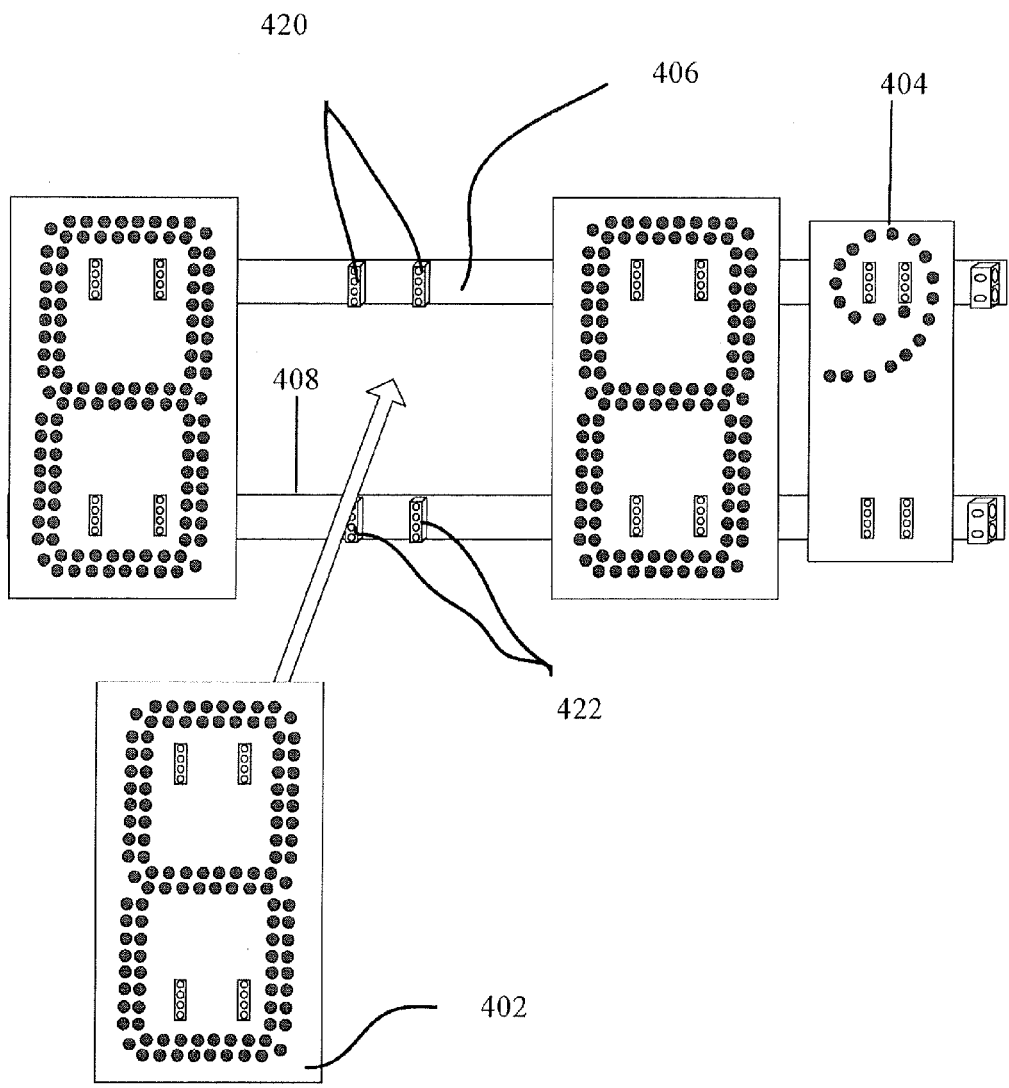
FIG. 13 illustrates an exemplary view illustrating two horizontal control data and power buses of the exemplary PCB assembly of FIG. 11.

FIG. 13 illustrates an exemplary view illustrating two horizontal control data and power buses 406, 408 of the exemplary PCB assembly 400 of FIG. 1A. FIG. 13 shows that a single digit intelligent plug-in LED panel 402 may be plugged into one or more control data and power buses 406, 408. Each control data and power bus 406, 408 may include one or more connectors 420, 422. For instance, the PCB assembly 400 may include two horizontal buses 406, 408, such as a top and a bottom bus. Each bus 406, 408 may include one or more connectors, such as a top pair of connectors 420 and a bottom pair of connectors 422.

Each connector 420, 422 may include several female receptacles configured or sized to accept corresponding male pins located on the back side of a single digit plug-in LED module 402. Alternatively, each connector 420, 422 may include several male pins configured or sized to be accepted by corresponding female receptacles located on the back side of a single digit plug-in LED module 402.

The connectors 420, 422 may support the plug-in LED module 402 vertically and in place. Preferably, interconnection between the connectors 420, 422 on the buses 406 and 408 with the corresponding connectors on the back of the plug-in LED module 402 provide the only vertical support for the plug-in LED module 402. The connectors 420, 422 may provide control signals and power to the plug-in LED module 402. Other means connecting the control data and power bus or buses to the plug-in LED modules may be used.

Figure 14:
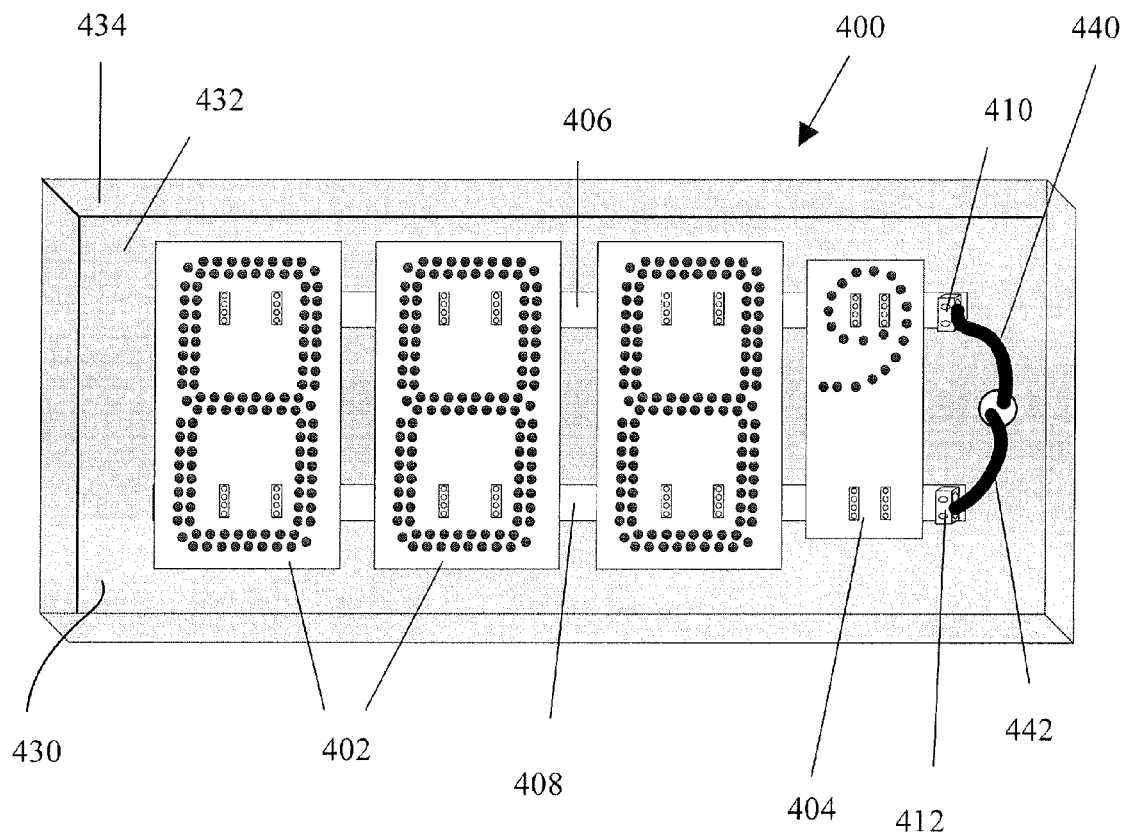
FIG. 14 illustrates an exemplary housing for encasing the exemplary PCB assembly of FIG. 11.

FIG. 14 illustrates a complete PCB assembly 400 and an exemplary housing 430 for encasing the exemplary PCB assembly 400 of FIG. 1A. The complete PCB assembly 400 may include slave modules 402, a master module 404, top and bottom buses 406, 408, top and bottom cable connectors 410, 412, control data and power cables 440, 442, and a housing 430. The complete PCB assembly 400 may include additional, fewer, or alternate components.

The housing 430 may be a weather proof housing with a flat back 432 and four sides 434. A transparent lid or cover may be configured to interconnect with the four sides 434 and provide the plug-in LED modules 402, 404 and buses 406, 408 protection from the weather.

The control data and power cables 440, 442 may be interconnected with the buses 406, 408 via the top and bottom cable connectors 410, 412. The control data and power cables 440, 442 may transfer control data and power received from a main power supply 446 and/or controller 450 to the buses 406, 408 and ultimately to the plug-in LED modules 402, 404.

Figure 15:
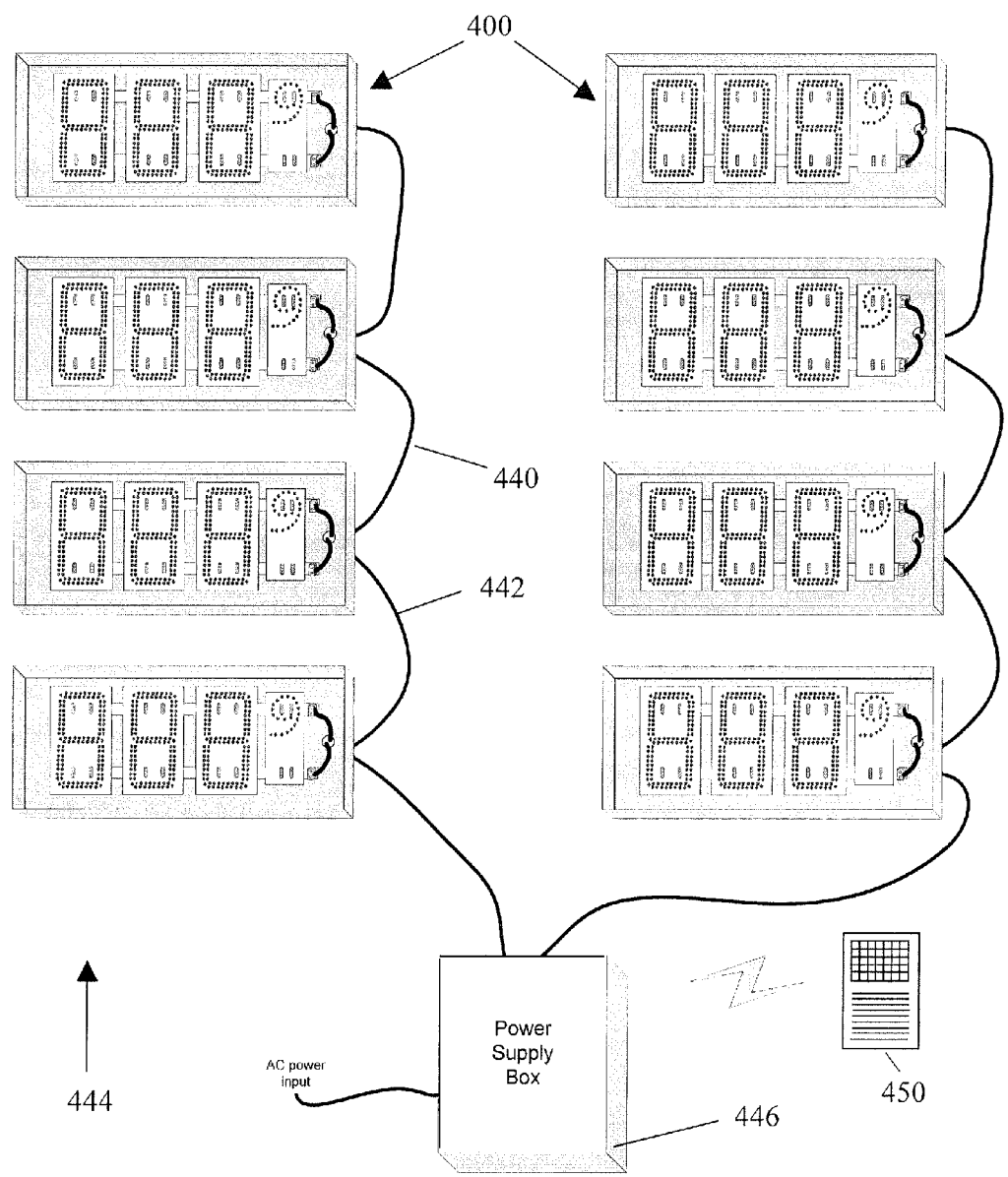
FIG. 15 illustrates an exemplary coordinated system interconnecting several individual PCB assemblies with a main power supply and a remote controller.

FIG. 15 illustrates an exemplary system 444 interconnecting several individual PCB assemblies 400 with a main power supply 446 and a remote controller 450. The system 444 may include complete PCB assemblies 400, cabling 440, 442, a main power supply 446, and a remote controller 450. In one embodiment, the remote controller 450 may be the same remote controller as remote controller 200. The system 444 may include additional, fewer, or alternate components.

The remote controller 450 may be used to enter pricing information and transmit control data, that may include pricing data, to a local controller. The local controller may be associated with the main power supply 446 or one or more of the PCB assemblies 400, such as a plug-in master module discussed above.

The main power supply and/or local controller 446 may transfer control data and power to each interconnected PCB assembly 400 via the cabling 440, 442. The cabling 440, 442 may interconnect the PCB assemblies 400 with the main power supply and/or local controller 446. The main power supply 446 may be powered by a AC or DC power outlet. Other arrangements, including other power supplies and controllers, may be used.

In one embodiment, the system 444 may include eight complete PCB assemblies 400. Other amounts of complete PCB assemblies 400 may be used, such as one, two, three, or four. For instance, each complete PCB assembly 400 may display pricing information for a different type of gasoline, such as the price of a gallon or regular, unleaded, premium, or diesel gasoline. In one embodiment, the system 444 may include similar components as found in system 100 and the system 444 may be able to connect to the system 100 via a network, cabling, or other means.

In one aspect, the present embodiments may include a method of remotely changing pricing information using a remote controller, such as the remote controller 200 depicted in FIG. 9 or the remote controller 450 depicted in FIG. 15. The method may incorporate any of the components described herein to perform the method. The method may include entering pricing information via a remote controller, wirelessly transmitting the pricing information, receiving the pricing information at a main power supply and/or local controller, sending individual pricing information to respective pricing modules/master modules, such as plug-in master LED modules located in complete PCB assemblies, and relaying the individual pricing information to respective slave LED modules to update a price that is displayed via LEDs. The method of remotely changing pricing information may include additional, fewer, or alternate actions.

Figure 16:
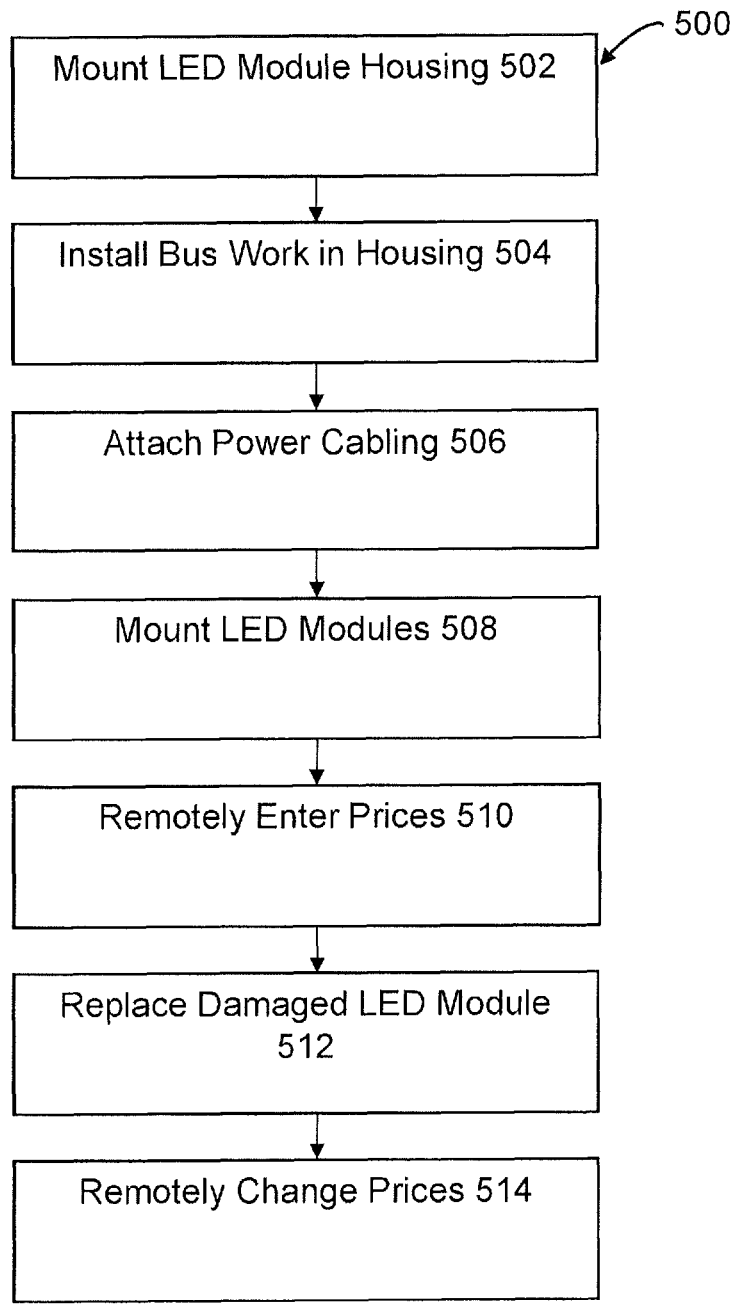
FIG. 16 illustrates an exemplary method installation and use of a coordinated system of PCB assemblies.

In another aspect, FIG. 16 illustrates an exemplary method of installation and use of a coordinated system of PCB assemblies 500. The method 500 may include mounting a LED module housing 502, installing bus work in the housing 504, attaching power cabling to the bus work 506, mounting LED modules onto the bus work 508, remotely entering pricing information 510, replacing damaged LED modules 512, and remotely changing pricing information 514.

The method 500 may include mounting a LED module housing onto a support structure 502. A rectangular housing or frame may be mounting onto a new or existing sign or other structure. The housing may be sized and configured to house plug-in LED modules and power and control bus work. Other housing may be used.

The method 500 may include installing bus work in the housing 504. Control data and power bus work may attached to a back of the housing. One or more buses carrying control data and/or power may be used. The bus work may include several male and/or female electrical connectors for plug-in interconnectivity with corresponding female and/or male electrical connectors attached to plug-in LED modules.

The method 500 may include attaching power cabling to the bus work 506. The bus work internal to the LED module housing may be interconnected with cabling leading to a main power supply and/or a main or local controller. The main power supply may provide power for the plug-in LED modules.

The method 500 may include mounting the plug-in LED modules 508. The plug-in LED modules may be mounted by plugging connectors on them into corresponding connectors on the bus work, as explained elsewhere herein. In one embodiment, the present embodiments may include three slave LED modules and one master LED module for each price to be displayed by a PCB assembly. The master LED module may relay power and control data signals received from a main power supply/controller.

The method 500 may include remotely entering prices 510. A remote controller may be used to enter desired pricing information for several PCB assemblies. Once entered, the remote controller may wirelessly transmit the pricing information to a main or local controller that is interconnected with the several PCB assemblies. After which, the several PCB assemblies may display the pricing information remotely entered.

The method 500 may include replacing one or more damaged plug-in LED modules 512. A damaged plug-in LED module may be removed or unattached from the power and control bus work, as discussed elsewhere herein.

The method 500 may include remotely changing pricing information 514. After original pricing information is entered and displayed by the coordinated system of PCB assemblies, the pricing information being displayed may be changed using the remote controller to enter new pricing information and then transmit the new pricing information to the coordinated system of PCB assemblies.

Figure 1B:
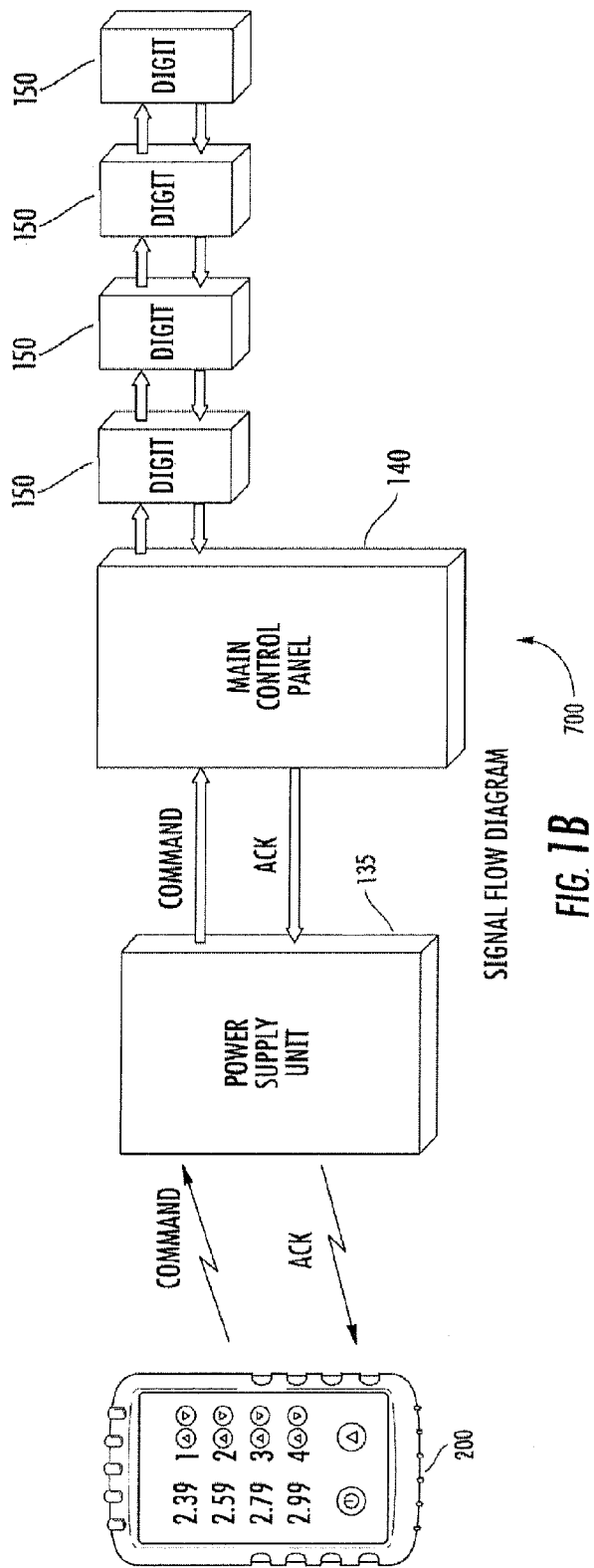
FIG. 1B illustrates an exemplary system featuring a control panel and power supply for use in an embodiment of the present disclosure.

3. Embodiments Featuring Use of a Main Control Panel for Controlling the Plug-in LED Modules Referring to FIG. 1B, FIG. 1B illustrates an exemplary system 700 featuring a main control panel 140 for controlling one or more plug-in LED modules 150 for displaying pricing information or other desired information. Notably, the system 700, in one embodiment, may perform the same and/or similar operative functions as system 100 and/or system 444. The system 700 may include the power supply 135, the main control panel 140, a remote controller 200, and a plurality of digit modules 150. Additionally, the system 700 may be configured to incorporate or otherwise include any of the components in system 110 and/or system 444. Additionally, the system 700 may include additional, fewer, or alternate components. For example, the system 100 may include any number of power supplies 135, remote controllers 200, processors, memory, or various other devices or components. The processors, which may be optional and may reside in any of the components in system 700, may be configured to execute instructions contained within the memory to execute various operations of functions disclosed herein.

In one embodiment, the main control panel 140 of the system 700 may be configured to perform the same or similar operative functions as performed by the master plug-in back panel module 110 and may act as a replacement for the master plug-in back panel module 110 in the system 700. In another embodiment, the digit modules 150 may be configured to perform the same or similar operative functions as the slave plug-in back panel modules 116 and the slave plug-in LED modules 115. In one embodiment, the digit modules 150 may incorporate the combined functionality and/or physical structure of the slave plug-in back panel modules 116 and the slave plug-in LED modules 115. In another embodiment, the main control panel 140 may be utilized to control the digit modules 150, such as in a similar fashion as the master plug-in back panel module 110.

Operatively, the system 700 may enable a user can utilize the system 700 to manipulate or adjust pricing information or other types of information associated with products, services, or other desired items. The user may activate the controller 200 using the power button 216 and can adjust information displayed on digit modules 150 using the up and down buttons 210 and 212. In order to adjust the information, the user can press the up and down buttons 210 and 212 to select an appropriate number or letter and hit the set button 214 to set the number or letter for a particular digit module 150. The act of selecting the set button 214 to set the number or letter may cause a command to be generated that sets the information accordingly. In one embodiment, once, the number or letter is set for the particular digit module 150, the controller 200 can transmit a control signal to the power supply 135, which includes the set number or letter. For example, the user may set the digit modules 150 to display the price "1255" and the controller 200 can transmit a control signal to the power supply 135 including the set pricing information. The power supply 135 can then relay the control signal/command to the main control panel 140.

Once the main control panel 140 receives the set pricing information (or other desired information), the main control panel 140 can send each digit in the price "1256" to each of the four digit modules 150 shown in FIG. 1B. For example, the main control panel 140 can send the number "1" to the first digit module 150, the number "2" to the second digit module 150, the number "5" to the third digit module 150, and the number "6" to the fourth digit module 150. Each of the digit modules 150 may be configured to transmit an acknowledgment back to the main control panel 140, after each of the digit modules 150 receive the pricing information from the main control panel 140. In one embodiment, the acknowledgements may serve as confirmations that each of the digit modules 150 received the pricing information from the main control panel 140. The main control panel 140 may then transmit the acknowledgements to the power supply 135 and the power supply 135 may then transmit the acknowledgements to the remote controller 200. As a result, this acknowledgement scheme may guarantee that the correct pricing information is set that will match the prices that are displayed on the remote controller 200. If acknowledgements are not received, the remote controller 200 may retransmit the pricing information to the power supply 135, which can retransmit the pricing information to the main control panel 140, which can then retransmit the pricing information to each of the digit modules 150. Notably, the system 700 may incorporate any of the functionality for the systems and methods described herein.

The arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The invention claimed is:

1. A printed circuit board (PCB) assembly for displaying information, the PCB assembly comprising:
   a plurality of power and control buses configured to carry power provided by a power supply and control signals provided by a controller;
   a plurality of plug-in back panel modules configured to be connected to each other via the plurality of power and control buses, wherein the plurality of plug-in back panel modules include a set of connectors configured to receive the power from the power supply and the control signals the controller; and
   a plurality of plug-in light emitting diode (LED) modules for displaying the information via a plurality of LEDs, wherein each of the plurality of plug-in LED modules includes a set of pins configured to connect to the set of connectors of each of the plug-in back panel modules, wherein each of the plurality of plug-in LED modules is configured to be individually plugged into, and removed from, each of the plug-in back panel modules, wherein lengths of the plurality of power and control buses are configured to be adjusted to connect the plurality of plug-in back panels to each other via the plurality of power and control buses at varying distances, and wherein the controller is configured to adjust the information displayed on the plurality of plug-in LED modules by transmitting a signal to adjust the information at the PCB assembly.

2. The PCB assembly of claim 1, wherein the plurality of LEDs of each plug-in LED module are configured to be electronically controlled by the controller to display the information as a letter or a number.

3. The PCB assembly of claim 1, wherein the plurality of power and control buses include conductive pathways configured to relay the power and the control signals to the plurality of plug-in LED modules when the plurality of plug-in LED modules are plugged into the plurality of plug-in back panel modules.

4. The PCB assembly of claim 1, wherein a failed plug-in LED module of the plurality of plug-in LED modules can be replaced with a new plug-in LED module by unplugging the failed plug-in LED module from a plug-in back panel module of the plurality of plug-in back panel modules that the failed plug-in LED module is plugged into and then plugging in the new plug-in LED module into the plug-in back panel module that the failed plug-in LED module was previously plugged into.

5. The PCB assembly of claim 1, wherein the information displayed by the plurality of plug-in LED modules comprises a price.

6. The PCB assembly of claim 1, wherein the controller is a remote controller configured to wirelessly control the information being displayed on the PCB.

7. The PCB assembly of claim 1, wherein the plurality of plug-in LED modules include three slave LED modules and one local master LED module.

8. The PCB assembly of claim 1, wherein each plug-in LED module is configured to be controlled by the controller to present a letter or a number within the information via the LEDs, wherein the controller is a remote controller that enables entry of new information and then adjusts the information being displayed by the plurality of plug-in LED modules so that the new information is displayed.

9. The PCB assembly of claim 1, wherein a failed plug-in LED module of the plurality of plug-in LED modules can be replaced with a new plug-in LED module without requiring electrical wiring maintenance to disconnect the failed plug-in LED module from wiring associated with the controller or power supply and then connect the new plug-in LED module to the wiring associated with the controller or power supply.

10. The PCB assembly of claim 1, wherein the pins of the plurality of plug-in LED modules are male pins and the connectors of the plug-in back panel modules are female connectors, wherein the male pins are sized to be compatible with the female connectors when the plug-in LED modules are plugged into the plug-in back panel modules.

11. A method for using a printed circuit board (PCB) assembly for displaying information, the method comprising:
receiving a control signal from a controller to adjust the information displayed on the PCB assembly, wherein the PCB assembly comprises:
a plurality of power and control buses configured to carry power provided by a power supply and the control signal provided by the controller;
a plurality of plug-in back panel modules configured to be connected to each other via the plurality of power and control buses, wherein the plurality of plug-in back panel modules include a set of connectors configured to receive the power from the power supply and the control signal from the controller; and
a plurality of plug-in light emitting diode (LED) modules configured to display the information via a plurality of LEDs, wherein each of the plurality of plug-in LED modules includes a set of pins configured to connect to the set of connectors of each of the plug-in back panel modules, wherein each of the plurality of plug-in LED modules can be individually plugged into, and removed from, each of the plug-in back panel modules, and wherein the plurality of plug-in LED modules includes slave LED modules and one local master LED module;
displaying the information on the PCB assembly via the plurality of LEDs of the plurality of plug-in LED modules, wherein the information is displayed based on the control signal received from the controller to adjust the information.

12. The method of claim 11, wherein the plurality of LEDs of each plug-in LED module are configured to be electronically controlled by the controller to display the information as a letter or a number.

13. The method of claim 11, further comprising replacing a failed plug-in LED module of the plurality of plug-in LED modules with a new plug-in LED module by unplugging the failed plug-in LED module from a plug-in back panel module of the plurality of plug-in back panel modules that the failed plug-in LED module is plugged into and then plugging in the new plug-in LED module into the plug-in back panel module that the failed plug-in LED module was previously plugged into.

14. The method of claim 11, wherein the plurality of power and control buses include conductive pathways configured to relay the power and the control signals to the plurality of plug-in LED modules when the plurality of plug-in LED modules are plugged into the plurality of plug-in back panel modules.

15. The method of claim 11, wherein the information displayed on the PCB assembly by the plurality of plug-in LED modules comprises a price.

16. The method of claim 11, further comprising adjusting lengths of the plurality of power and control buses such the plurality of plug-in back panel modules may be connected to each other via the plurality of power and control buses at varying distances.

17. The method of claim 11, further comprising replacing a failed plug-in LED module of the plurality of plug-in LED modules with a new plug-in LED module without requiring electrical wiring maintenance to disconnect the failed plug-in LED module from wiring associated with the controller or power supply and then connecting the new plug-in LED module to the wiring associated with the controller or power supply.

18. A printed circuit board (PCB) assembly for displaying information, the PCB assembly comprising:
a housing;
a plurality of power and control buses configured to carry power and control signals;
a plurality of plug-in back panel modules configured to be connected to each other via the plurality of power and control buses, wherein the plurality of plug-in back panel modules include a set of connectors configured to receive the power and the control signals;
a plurality of plug-in light emitting diode (LED) modules for displaying the information via a plurality of LEDs, wherein each of the plurality of plug-in LED modules includes a set of pins configured to connect to the set of connectors of each of the plug-in back panel modules, wherein each of the plurality of plug-in LED modules can be individually plugged into, and removed from, each of the plug-in back panel modules, wherein the plurality of power and control buses, the plurality of plug-in back panel modules, and the plurality of plug-in LED modules are housed in the housing,
wherein the plurality of plug-in back panel modules includes a local master plug-in back module and a plurality of slave plug-in back panel modules, and wherein the plurality of plug-in LED modules includes a local master LED module configured to connect to the set of connectors of the local master plug-in back panel module and a plurality of slave LED modules configured to connect to the set of connectors of each of the slave plug-in back panel modules; and a controller configured to adjust the information displayed on the plurality of plug-in LED modules by transmitting a signal to the local master plug-in back panel module to adjust the information at the PCB assembly.

* * * * *